May 10, 1932.     H. H. STEELE     1,858,027
COMBINED TYPEWRITING, COMPUTING, AND CHECK PROTECTING MACHINE
Filed Nov. 12, 1924      8 Sheets-Sheet 2

Inventor:
Herbert H Steele
by D.C.Hickman
Attorney

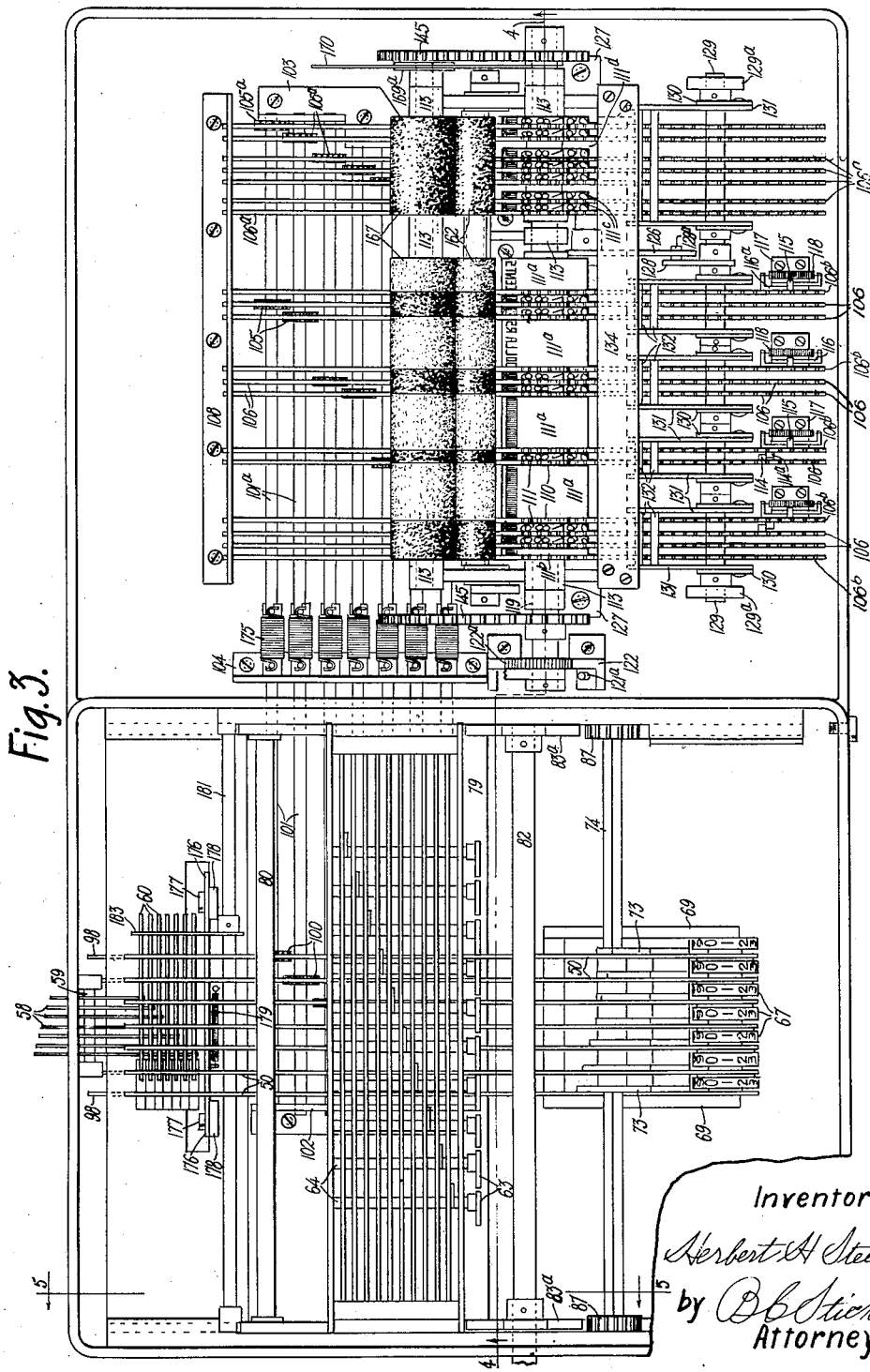

May 10, 1932. H. H. STEELE 1,858,027
COMBINED TYPEWRITING, COMPUTING, AND CHECK PROTECTING MACHINE
Filed Nov. 12, 1924 8 Sheets-Sheet 4
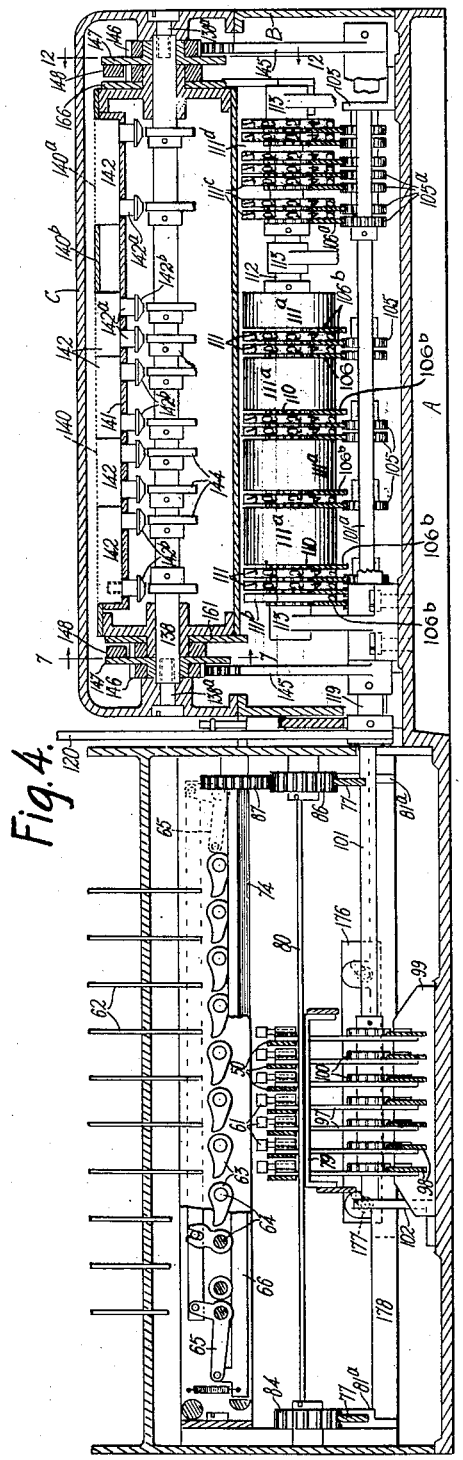
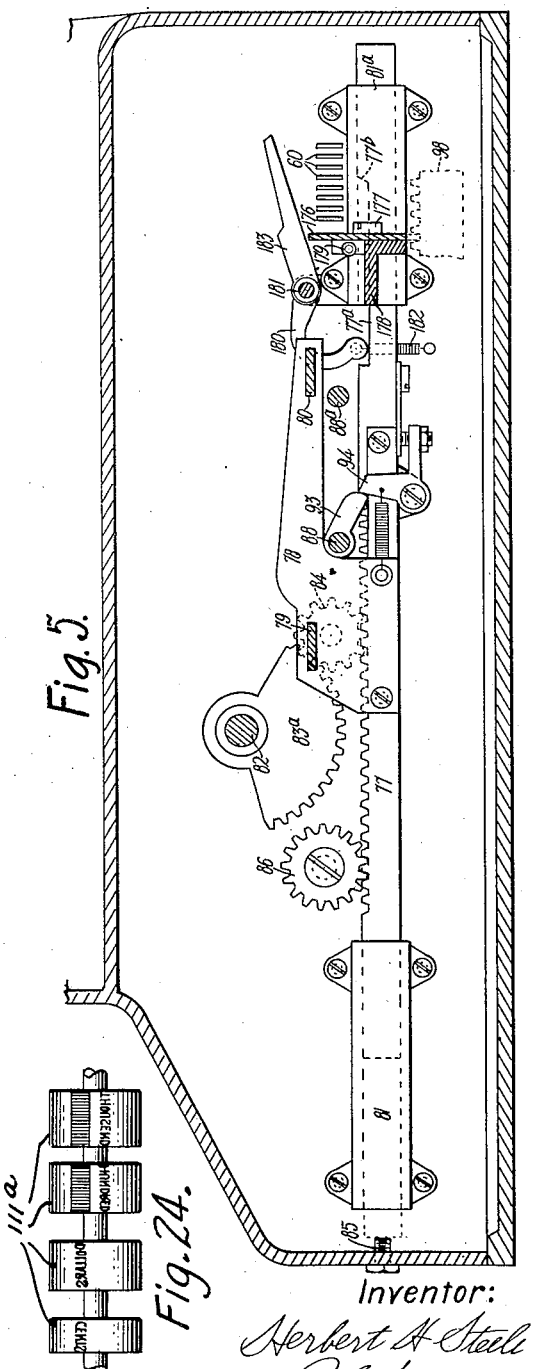
Inventor:
Herbert H. Steele
by D. C. Stickney
Attorney May 10, 1932. H. H. STEELE 1,858,027
COMBINED TYPEWRITING, COMPUTING, AND CHECK PROTECTING MACHINE
Filed Nov. 12, 1924  8 Sheets-Sheet 5
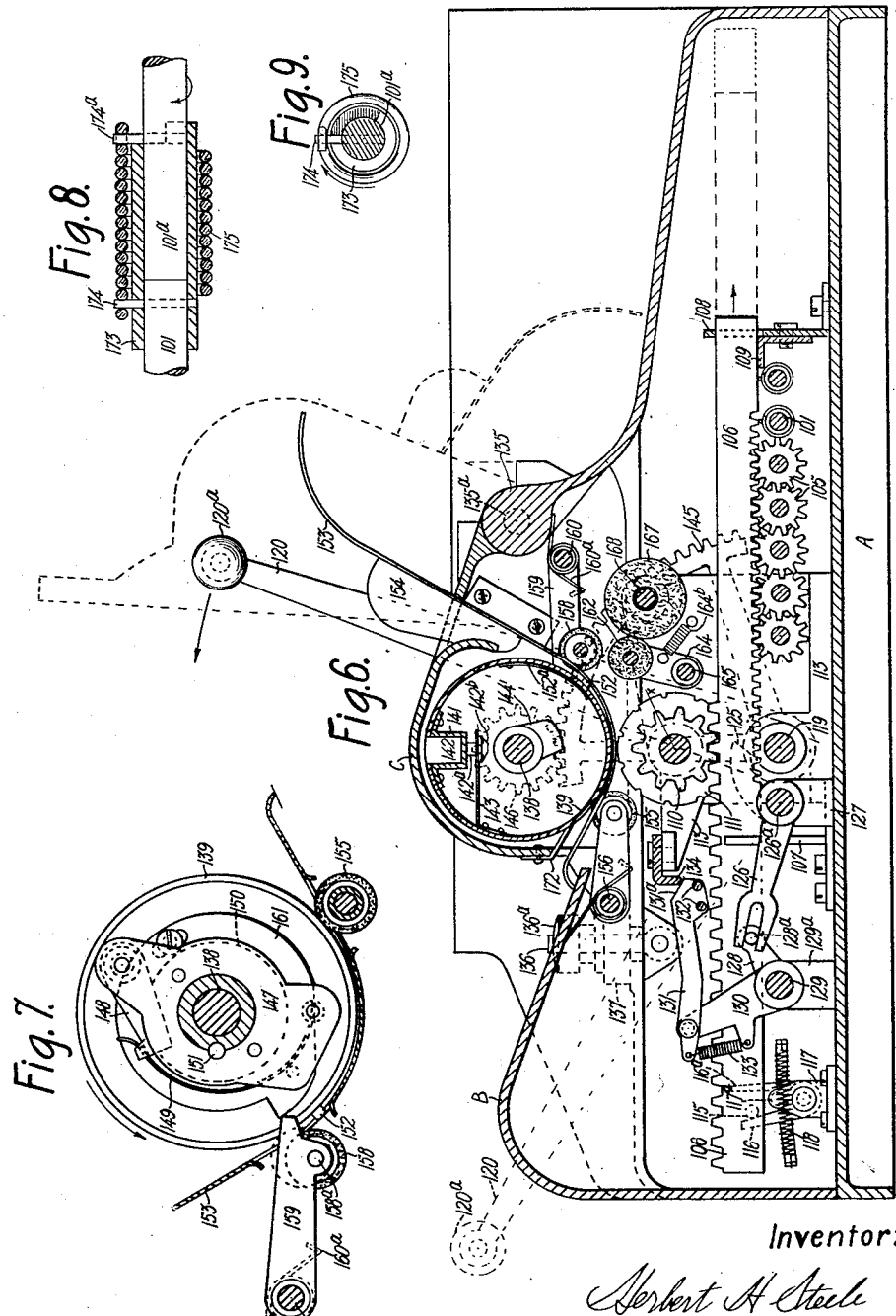
Inventor:
Herbert H Steele
by D C Stickney
Attorney May 10, 1932.   H. H. STEELE   1,858,027
COMBINED TYPEWRITING, COMPUTING, AND CHECK PROTECTING MACHINE
Filed Nov. 12, 1924    8 Sheets-Sheet 6
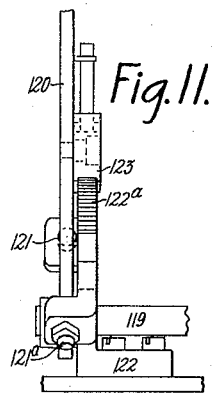
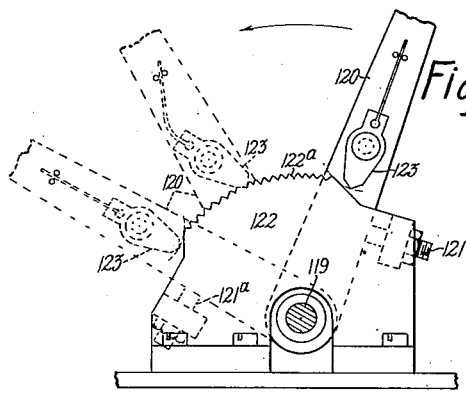
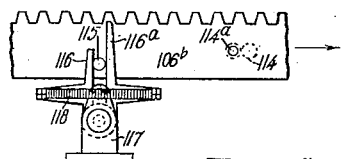
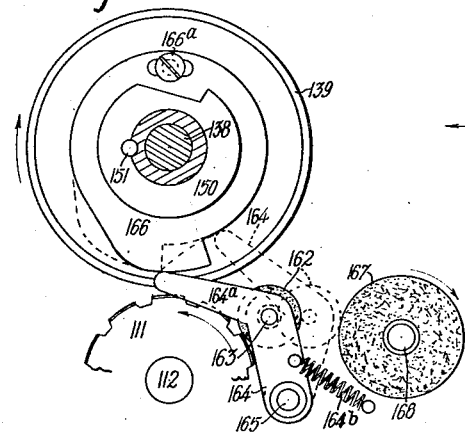
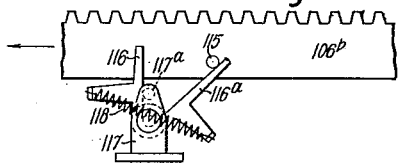
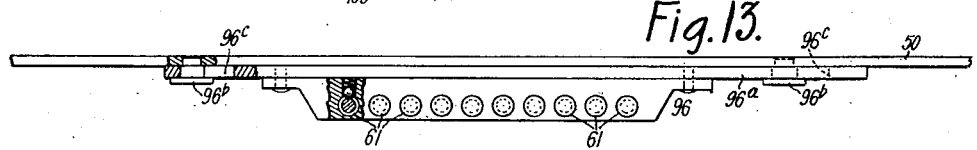
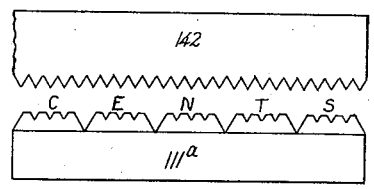
Inventor:
Herbert H. Steele
by B.C. Stickney
Attorney May 10, 1932.  H. H. STEELE  1,858,027
COMBINED TYPEWRITING, COMPUTING, AND CHECK PROTECTING MACHINE
Filed Nov. 12, 1924  8 Sheets-Sheet 7
Fig. 17.
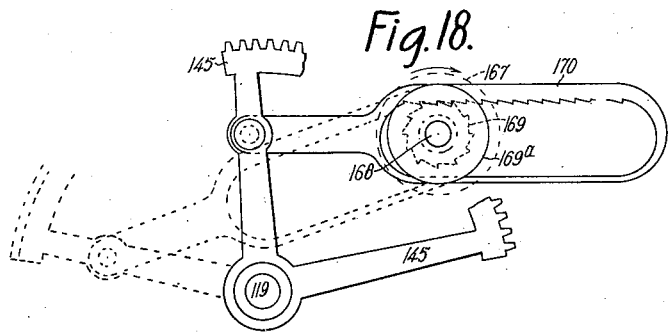
Fig. 18.
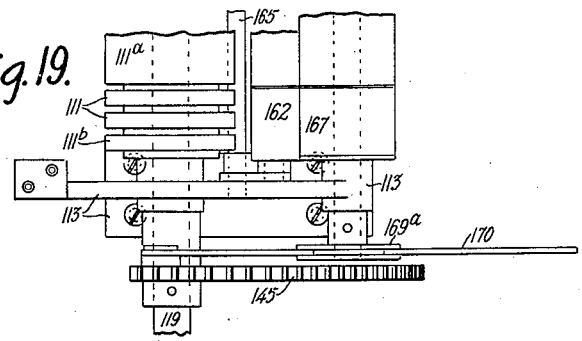
Fig. 19.
Inventor:
Herbert H. Steele
by D. C. Stickney
Attorney

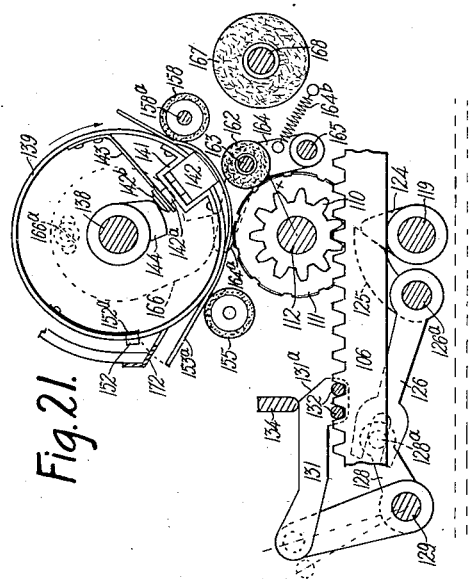
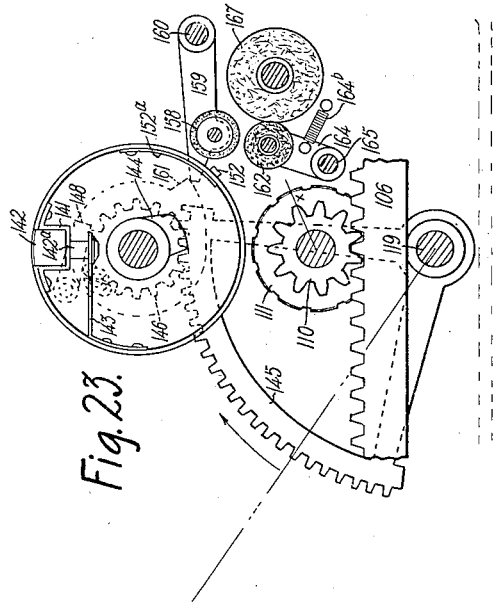
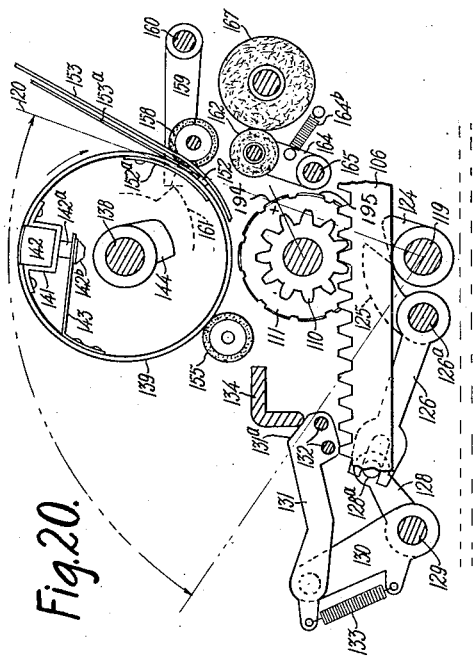
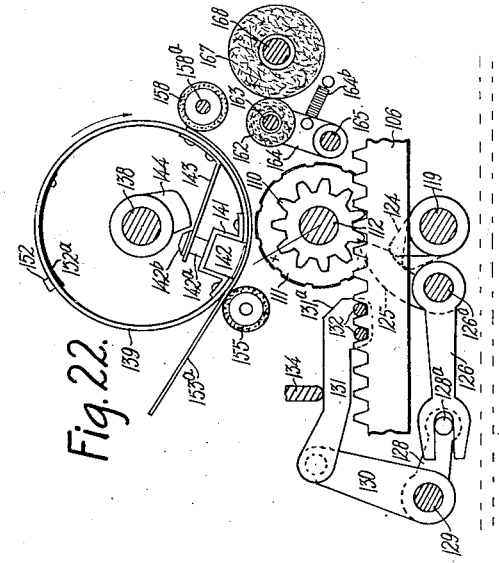

Patented May 10, 1932

1,858,027

UNITED STATES PATENT OFFICE

HERBERT H. STEELE, OF LYNBROOK, NEW YORK, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING, COMPUTING, AND CHECK-PROTECTING MACHINE

Application filed November 12, 1924. Serial No. 749,401.

This invention relates to bank-check writing and is herein shown as applied to a combined typewriting and computing machine of the Underwood-Hanson type as disclosed in the patent to Hart, No. 1,190,171, dated July 4, 1916, where numeral-keys, when depressed to record a number, set up individual indexing pins, one for each printed digit; and the digits thus set and printed are later carried to accumulator-wheels that make up a register by a series of digit-bars operated by the carriage, each carrying a set of indexing pins that are individually settable to represent a preliminary denominational value.

In the present invention, the setting up of these indexing pins in the digit-bars by the numeral-keys in printing a number, and the subsequent movement of the bars to register their individual values on their associated accumulator-wheels, simultaneously register the same values upon a series of check-printing type-wheels that subsequently record the same values in a different form in dollars and cents upon the same work-sheet previously printed to set up these values.

The preparation of the weekly cash payroll in large corporations is a burdensome and costly addition to the overhead expense. The drawing of a pay-roll from the bank in mixed currency, separating it in small amounts, filling envelopes previously marked for identification and then distributing them, forced many of the railroads to adopt bimonthly pay-days. The development of the pay-roll check has changed all this, and today railroads and many large corporations are using the pay-roll check as a medium for a weekly settlement with their employees. In the preparation of these checks, the check is first typewritten for the insertion of date, payee's name and amount, and then some one of the many forms of check-writing protectors is employed as a separate operation to enter the amount in the body of the check, which must subsequently be signed or counter-signed.

These so-called check-writers are protective machines only and have no labor-saving qualities, and as they do not preserve a record of the amount entered upon each check, the final checking up of the machine-written-checks for a total to balance with the pay-roll records, opens up gaps for errors to creep in, and is still an expensive method.

In the present invention, the combined mechanisms produce a finished product, a check that is complete except for the signature. The typewriter prints the date, the payee's name and, at the right-hand end of the same line, the amount of the check in numerals, and, simultaneously with the printing of these numerals, automatically sets up similar denominational values in dissimilar forms; one form as a register where each check value is accumulated for a grand total, and the other form as printing elements that shred or emboss the set-up amounts in words and numerals by inked paper-cutting typefaces at the left-hand end of the amount line, and again in numerals only at the extreme right-hand end of the line; thus making three different amount-entries on the check, one typewritten, and two indelibly cut in the paper to provide for a greater protection against check-raising. Furthermore, the registering of the amount of each check at the register-wheels provides a total to balance with the pay-roll records, or if employed in a bank or a treasurer's office, provides a total for the day's transaction in disbursed funds.

In a combination machine of this character, the printing of a cipher by the typewriter adds nothing to the computing elements except a denominational position, but the value of this cipher must be transferred to the check-printing elements to print its denominational value on the check; and hence a general operator that transfers the set-up unit values in the digit bars to the register-wheels in units of "1" to "9" must simultaneously transfer an extra unit into the check-printing wheels to provide for the printing of the cipher on the check. To these ends each digit bar, which has heretofore carried nine index pins, in the present invention carries a series of ten index pins mounted within a shuttle-bar secured loosely to the face of each digit-bar to have a free and independent movement of one digit dimension, before any movement can be conveyed to said bar, and to have a positive connection to its check-printing rack-bar to move the latter distances of from one to ten digit-dimensions, but the digit-bar will only be operative from one to nine digit-dimensions, as heretofore.

Another feature provides for a two-color ink distribution to the paper-cutting faces of the type, that certain words may be written in one color on the check and certain numerals in another color for a contrast and quick reading of the amount.

Another feature provides for a rotary check-carrier with a normally inoperative paper-cutting platen and a series of normally inoperative paper-cutting type-elements, that at a predetermined interval in the carrier's movement rotate in synchronism with the carrier during a predetermined interval while the platen and type co-operate to shred the amount in words and numerals in the body of the moving check, and during a continuous rotation of the carrier.

Another feature provides for the setting up of the full amount in dollars and cents in a continuous line in both words and numerals by a key-manipulated type-printing operation, and for subsequently printing the full line of set-up cutting type-faces at a single operation.

Another feature is the timing of the inking element, that ink will only be applied to such type-faces that have been selected for printing on the check, and during the interval that the inking rollers are inactive, they engage with a larger rotating ink-supply roller to maintain a uniform distribution of ink. The paper-cutting type-faces are coated with a thick indelible ink, which necessitates frequent cleaning to prevent smearing at the back of the check, and, for this purpose, the upper frame-section is hinged to swing back to give access to the cutting type-faces and to the paper-cutting platens for cleaning purposes.

Another feature consists of a series of rack-bars that move to a fixed-stop position to operate the register-wheels to register a predetermined value, and a second series of rack-bars that move in unison with the first series to set up a similar value on check-printing wheels; the two series of racks having a flexible connection that enables the check-printing racks to advance a predetermined distance in the same direction and independently of the register-racks, to print the set-up value on the check.

Paper mutilating check protectors, as heretofore described, in printing a small amount, like ten dollars, only mutilate a very short section of the amount line, and it has been an easy matter to erase this short printed section and substitute a new line for a larger amount in the unused area of the amount line.

Another feature of this invention provides for sectional inked paper-cutting elements for cutting a blank surface-destroying area through the entire length of the amount line on the check, and which elements are automatically displaced by word and numeral paper-cutting types predetermined by a key manipulation, thus mutilating the area not employed in writing the amount on the check, and effectively preventing any subsequent change in the amount, because it is a well-known fact that a type-cut surface on a check cannot be recut without detection.

Another feature consists of a normally-inoperative aligning device to bring the entire line of paper-cutting type-faces into longitudinal alignment after a key-manipulated assemblage and during their active period in printing the check.

Another feature consists of a rotary check-carrier having aligning fixed stops for the leading edge of the check, and a plurality of normally-inoperative feed-rolls that become effective to feed the check at the initial movement of the carrier.

Other features and advantages will hereinafter appear.

In the accompanying drawings,

Figure 3 is a plan view of the computing and check-writing elements as though the top section of the frame had been removed.

Figure 4 is a longitudinal vertical section looking from the front at the line 4—4, Figure 3.

Figure 5 is a vertical section through the computing base indicated by the line 5—5 of Figure 3.

Figure 6 is a vertical section through the check-printing mechanism indicated by the line 6—6 of Figure 1.

Figure 7 is an enlarged view of the left-hand end of the check-carrier, on the line 7—7 of Figure 4.

Figure 8 is an enlarged detail view in section, showing the manner of connecting the two sections of the rack-driving shafts for flexibility.

Figure 9 is an end elevation of Figure 8.

Figure 10 is a three-position view of the check-writing actuating lever and its means to enforce a full stroke in both directions.

Figure 11 is an end view of Figure 10.

Figure 12 is an enlarged detail view of the right-hand end of the check-carrier and the cam arrangement that controls the ink-distributing roller, on the line 12—12 of Figure 4.

Figure 13 is a detail top plan view, partly in section, of one of the accumulator-actuating rack-bars with the index-pin shuttle secured to the side thereof.

Figures 14 and 15 are positional views, showing the method of automatically bringing a word-wheel to the printing position when its co-operative figure-wheel is operative to print.

Figure 16 is an enlarged view of the paper-cutting type elements.

Figure 17 illustrates a blank check filled in by the typewriter and check-writer in a manner according to this invention.

Figure 18 is a fragmentary view illustrating the manner of rotating the ink-supply-roller by a connection to the driving sector.

Figure 19 is a plan view showing the parts in Figure 18 assembled in operative position to the type-wheels and ink-rollers.

Figure 20 is a diagrammatic view showing the several parts of the check-writer positioned as when a check has been inserted at the rear and the carriage rotated to a point where the feed-rolls have just become effective to feed the check.

Figure 21 shows the check advanced by the carrier to a point where the cutting platen of the carrier is in position to move in unison with the cutting type faces; the ink-roller against the printing sections; and the aligning elements in full engagement with the active racks.

Figure 22 shows the printing of the check completed; the ink-roller restored to its supply-roller; and the type-wheels locked while the check-carrier completes its revolution at the end of the forward stroke of the actuating hand lever.

Figure 23 shows the same parts at the end of the forward stroke of the actuating lever, when the check-carrier has made a complete revolution and the feed-rolls have been released and the check removed.

Figure 24 shows the word-bearing wheels 111$^a$ as they appear by looking at the machine from the rear and at Figure 20 from the right.

Figure 1:
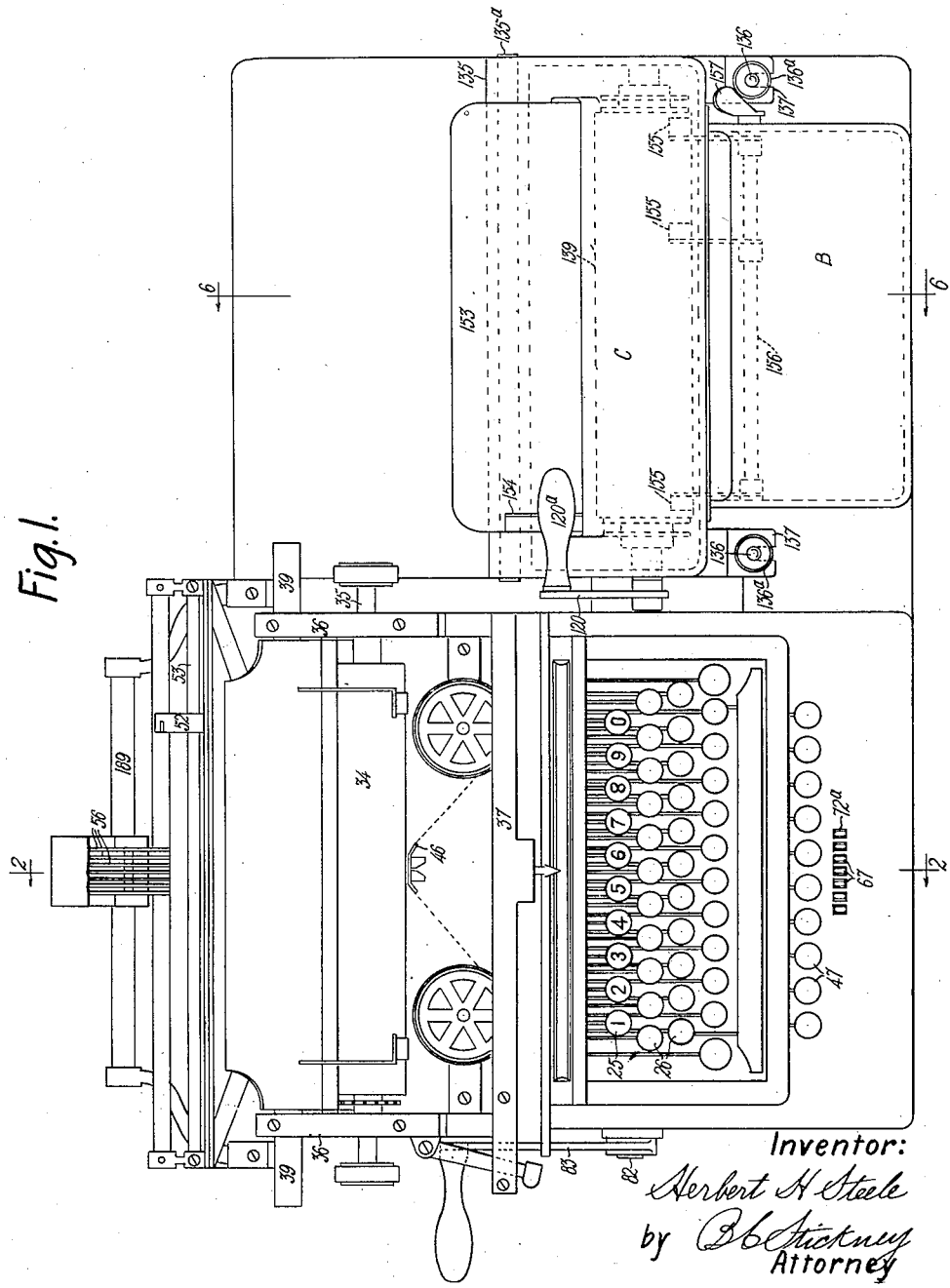
Figure 1 is a plan view of the well-known Underwood combined typewriting and computing machine arranged for co-operation with the check-writing attachment arranged at the side thereof, forming the subject-matter of this invention.

Numeral-keys 25 and alphabet-keys 26, when depressed, operate their key-levers 27 about a fulcrum rod 28 to vibrate bell-crank 29 about a fulcrum 30 and cause their associated type-bars 31 to swing upwardly and rearwardly about a fulcrum wire 32 to cause the type-faces 33 to print at a common printing point on the front side of a rotatable platen 34 mounted upon a shaft 35 that takes bearings in the two ends of a platen-frame 36 carried by a carriage 37 that moves from right to left upon guide-rods 38 and 39, under the influence of a spring motor (not shown) connected to the carriage. The step-by-step feeding movements of the carriage are controlled by the usual carriage feed-rack 40 pivotally hung from the platen-frame 36 and in mesh with an escapement-pinion 41, to drive an escapement-wheel 42, formed with the usual teeth to interlock with escapement-dogs 43$^a$ mounted upon a rocker 43. Each type-bar is provided with a heel 44 that strikes a universal bar 45 to vibrate the rocker 43 at each type impact at the platen to move the dogs 43$^a$ into alternate co-operation with the wheel 42 for letter-spacing and also vibrate the ribbon-carrier 46 to raise the ribbon to cover the printing field just before each type impact.

The machine is provided with the usual decimal tabulator that includes keys 47 and denominational stops 47$^a$ that co-operate with a stop 48 adjustably mounted upon a stop-bar 49 supported by the carriage.

The computing mechanism includes a series of index-pin-carrying bars 50, guided at the rear end by a comb-plate 51 and a transversely-slotted rod 51$^a$ at the front ends, the bars being raised one at a time to an index-pin-setting position while the carriage traverses a computing zone.

Figure 2:
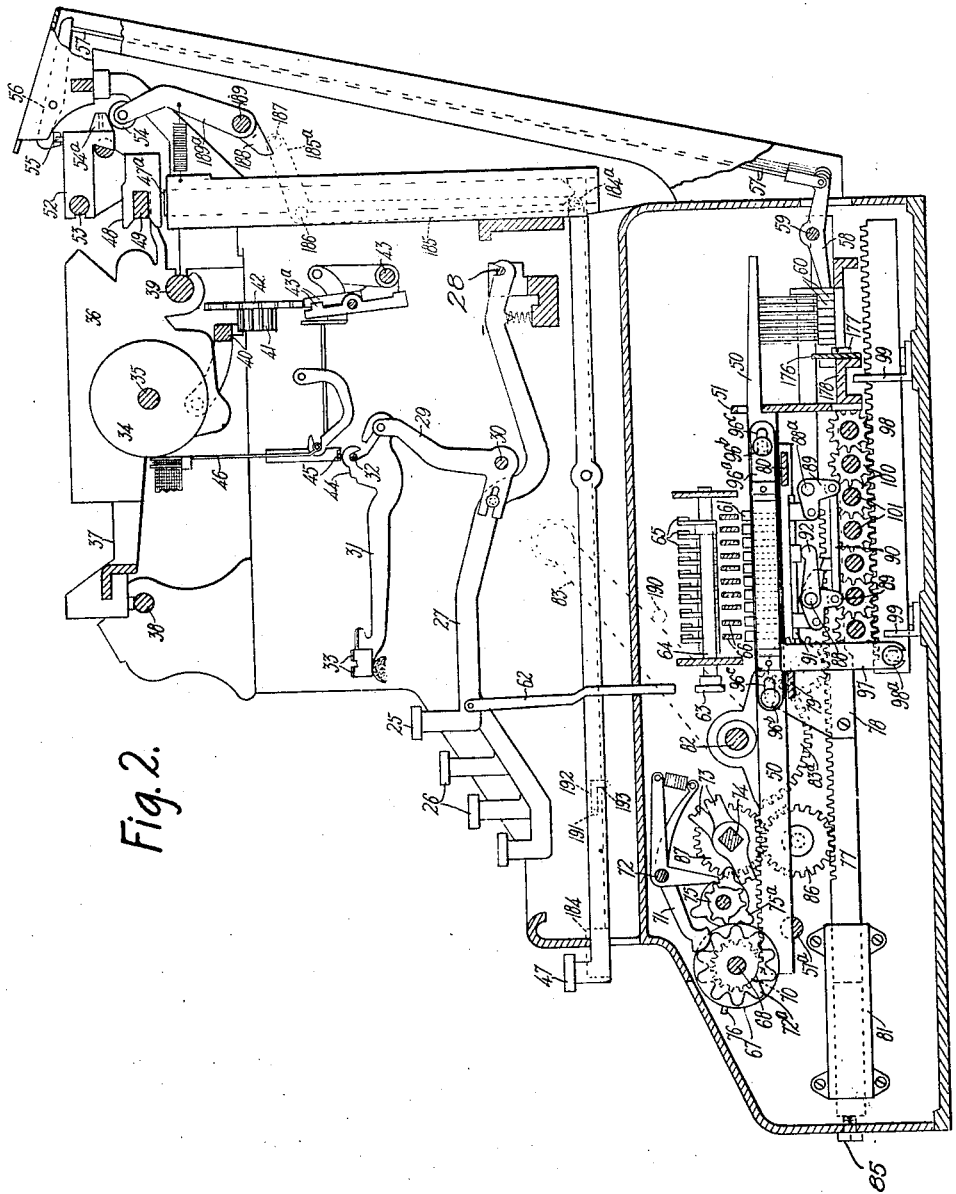
Figure 2 is a vertical longitudinal central section through the typewriting-computing machine on a plane indicated at 2—2 of Figure 1.

To selectively raise the pin-carrying bars 50 to pin-setting positions, the carriage is provided with selectors 52 adjustably mounted upon a cross-rod 53. When the carriage reaches the computing zone a roller 54$^a$ of the selectors 52 rides upon a roller 54 centrally located upon the machine to bring a tappet 55 into co-operation with jacks 56 one at a time to depress push rods 57 to rock levers 58 about a fulcrum 59, the inner ends of the levers (Figures 2 and 3) engaging with cross-bars 60 underlying the pin-bars 50; the levers 58 being so arranged that the extreme right-hand lever of the highest denomination will engage with the pin-carrying bar 50 at the extreme left, which is also the highest denominational position.

When a numeral-key 25 is depressed, a pendent finger 62 engages with a crank-arm 63 to rock a shaft 64 and move links 65 to convey a vertical parallel movement to a pin-setting bar 66 (Figure 4) to depress a pin 61 on any pin-carrying bar raised to a pin-setting position.

Each register may comprise a series of decimal-order digit-bearing wheels 67 mounted for rotation upon a shaft 68, supported by side plates 69 of a bracket rising from the base of the casing. Gears 70 are loosely mounted at the side of each wheel and connected thereto by a ratchet and a one-way clutch (not shown) that mesh with the toothed upper edge of the bars 50. The wheels 67 are held against accidental movement by spring-pressed detents 71 mounted upon a transverse rod 72 and engaging with wheels 72$^a$ fixed to the wheels 67.

The tens carrying is effected through a set of toothed arms 73, spirally arranged upon a square shaft 74, which rotate carry-over pinions 75 when a tooth 76 on any wheel 67 enters a carry-over position. Each carrying pinion 75 has a three-toothed wheel 75$^a$ connected thereto which engages with a wheel 72$^a$ of the next higher denomination.

When the bars 50 stand in their normal positions, their index-pins 61 stand directly under their respective bars 66 and lie far enough below the same so that the depression of said bars will not engage the index-pins of the bars unless the rear end of a bar is raised by its decimal-order selecting lever 58.

A general operator, comprising a pair of rack-bars 77, Figure 5, side plates 78 fixed thereto, and a pair of transverse tie-bars 79 and 80, is mounted within the casing and arranged to move through suitable guides 81 and 81$^a$ secured to the casing. The bar 80 normally stands a little to the rear of the rearmost index-pins 61 and at an elevation that it will pass forwardly under the lower ends of such index-pins as have not been forced downward or set but will engage any and all pins of the several bars 50 which have been set.

Mounted in suitable bearings in the side walls of the casing and extending above the bars 50, is an operating shaft 82 having a crank arm 83 at the left-hand end outside the casing, and having inside the casing segmental gears 83$^a$ meshing with gears 84 that in turn mesh with rack teeth cut in the upper edge of the bars 77 of the general operator. Thus the general operator may be moved forward or backward by the movement of the crank arm 83 outside the casing, and the extreme forward movement of said operator may be adjustably limited by check screws 85 in the casing. The left-hand rack-bar 77 of the operator also is in mesh with a gear 86 rotating upon a screw threaded into the side frame, which in turn meshes with a gear 87 that drives the shaft 74 through a one-way clutch (not shown).

Such index-pins 61 as have been set in one operation must be restored at the end of the operation. A pair of rods 88 and 88$^a$ extend transversely across the casing with their ends mounted therein; the rod 88$^a$ being stationary and the rod 88 free to turn. Bell-cranks 89 joined together by a sleeve are mounted loosely upon each rod 88 and 88$^a$ and connected together by a link 90, to convey a vertical parallel movement to arms of the bell-cranks that are pivoted to ears depending from a pin-restoring plate 91 positioned to underlie the whole series of index-pins 61. The rod 88 has a short arm 92 to engage with the under side of the plate 91 to restore the index-pins, and as this operation must take place at the extreme end of the general operator's return movement, the rod 88 is provided with a cam-arm 93, Figure 5, operated by a spring-pressed dog 94 pivotally hung from the bar 77 of the general operator that cams the arm 93 at the extreme end stroke of said operator, and on the initial forward stroke of the operator the dog 94 will snap under the arm 93 without effect.

This description up to this point covers briefly the Underwood-Hanson computing mechanism, further details of which may be had from the Hart patent referred to.

In the old computing mechanism just described, each bar 50 carries a series of nine index-pins, because in printing a cipher nothing is added to the register except its denominational value, which is automatically registered by the letter-spacing movement of the carriage to the bars 60, but in simultaneously setting up the equivalent amount in an adjoining mechanism arranged to print the amount upon a bank check the cipher must be set up and printed. For this reason, each bar 50 is re-arranged to carry a series of ten index-pins 61, but the movement of the general operator in advancing said bars through a ten-pin movement would upset the whole computing mechanism adapted only for a nine-point movement. It is necessary therefore from a fixed movement of the general operator, to transmit a new ten unit movement to the check-printing mechanism and the old nine unit movement to the computing mechanism. To this end, the ten index-pins are not mounted within to the index-bars 50 as heretofore, but their pin-block is fixed to a plate 96$^a$ (see Figure 13) that is secured to the face of the bar 50 by large-headed, shouldered rivets 96$^b$ that pass through slots 96$^c$ in the plate 96$^a$ to guide said plate and its block of pins for limited longitudinal movements independently of the bar. This construction provides that the pins may have a free movement of one pin-space independently of the bar 50, and hence when a pin is set the pin will be picked up by the cross-bar 80 of the general operator and moved the limits of the slot 96$^c$, when the bar-driven pin-block picks up its bar 50, and said bar and block of pins will move in unison to register in the usual manner. On the return stroke of the general operator the cross-bar 79 thereof engages the arm 97 that is pendent from the plate 96$^a$ and moves the pin-block to the opposite end of the slot 96$^c$, when its bar 50 will be shifted back to its normal position against the comb-plate 51. Thus from a uniformly fixed movement of the general operator the pin-carrying shuttle has a variable movement of from one to ten unit distances, and from the same movement of the general operator the bar 50 has an operative movement of from one to nine unit distances.

The arm 97 that is pendent from each plate 96$^a$, of the pin-blocks 96 may terminate at an open slot to embrace a stud 98$^a$ projecting from the side face of the forward end of a rack-bar 98 held in a vertical relation under each bar 50 by suitable comb-plate 9⁹ secured to the base of the casing. When any pin-block 96 is moved by the bar 80 of the general operator, the arm 97 will convey a similar movement in two directions to its associated rack 98, and said rack, like the pin-blocks, will have an extreme movement equivalent to a ten unit distance.

The object of the rack-bars 98 is to convey an equivalent movement of the pin-blocks to an adjoining machine. Hence each rack-bar is in mesh with a transmission pinion 100 secured to a shaft 101 positioned transversely above the racks 98. In the typewriting element, provision is shown for an adding zone of seven digits, with seven jacks 56 operating seven levers 58 and seven index-pin-bars 50. Hence there are seven shafts 101 that lie in parallel horizontal planes above the racks 98, and the pinion 100 secured thereto is positioned to align with the rack position. These seven shafts take an end bearing in a bracket 102, Figure 3, secured to the base of the computing casing and extend rightward to traverse the adjoining check-printing casing where the ends take a bearing in a bracket 103. As these shafts are long and comparatively small in diameter, an intermediate bracket 104 gives a center support for the seven shafts, and said shafts are divided into two sections, one section 101 within the computing casing and the other section 101ª within the check-printing casing. This division is made for purposes presently to appear.

These seven shafts within the check-printing casing carry a pinion 105 similar to the pinion 100, and each is in mesh with one of a series of seven rack-bars 106 guided by a front comb 107 and an adjustable rear comb 108. The operative movement of the bars 50 is towards the front of the machine for computing purposes, where the reading of the register-wheels 67 is convenient to the operator's position. The rack-bars 106 have an operative movement towards the rear; hence the transmission from the bars 50 through the shafts 101 and 101a requires that the pinions 105 shall mesh with rack-teeth cut on the lower edge of the bars 106, and to promote a free sliding movement of the bars through the comb 108, a shoe-plate 109 adjustably secured to the comb provides a wide bearing surface to ride over the face of the teeth.

The forward upper edges of each bar 106 provides a second toothed rack that is in mesh with a gear 110 secured to a type-printing numeral-wheel 111 mounted upon a stationary shaft 112 suspended by three brackets 113, Figures 3 and 4, secured to the base-plate of the frame. Each type-printing numeral-wheel 111 that is in mesh with a rack 106 has eleven raised type-faces equally spaced circumferentially around the wheel; ten of these types include the ten numerals "1" to "0" and the eleventh type a check-surface-mutilating unit for purposes presently to appear. As shown at Figures 3 and 4, the numeral-bearing wheels 111 are positioned on the shaft 112 to co-operate with four word-bearing wheels 111ª, one carrying the word "cents", another "dollars", a third "hundred" and a fourth "thousand", with two numeral-wheels 111 to separate the wheels carrying "cents" and "dollars", two more between "dollars" and "hundred", one between "hundred" and "thousand", and two between "thousand" and the outside check-mutilating unit wheel 111ᵇ; the series of eleven numeral and word wheels have a capacity to print any amount up to 99 thousand 9 hundred and 99 dollars and 99 cents in numerals and words, and these wheels are grouped together to print at the left-hand portion of the amount line of a check. It is also the purpose of this invention to duplicate the amount printed in numerals only at the extreme right-hand end of the amount line on the check, and for this purpose it will be noted at Figure 3 that each shaft 101ª carries two pinions 105 and 105ª, the latter engaging with rack-bars 106ª that operate a series of seven digit-bearing wheels 111ᶜ that are a duplicate of the wheels 111. These seven wheels are grouped together, and to eliminate punctuation between denominations a wide gap 111ᵈ is provided between "dollars" and "cents" and between the "thousandths" and "hundredths" positions.

The surface-destroying unit on the two left-hand word-wheels 111ª and the words dollars and cents on the third and fourth word-wheels 111ª, Figure 3, are located normally in line and in the peripheral position 194, Figure 20, while the zero-characters on all the numeral-wheels 111, 111ᶜ and 111ᵈ, Figure 3, and the words thousand and hundred on the two left-hand word-wheels 111ª, Figure 3, shown at the right in Figure 24, are located in the position 195, Figure 20.

All of the numeral-wheels 111 and 111ᶜ, as just described, are rotated by racks 106 or 106ª controlled by the rotation of the pinions 100 and shafts 101. The four word-wheels 111ª and the end wheel 111ᵇ are also rotated by a rack 106ᵇ similar to the racks 106, but have no pinion driving connections to the shafts 101ª, and the control of these four wheels by their racks has a distinct function presently to appear.

The word-wheels "hundred" and "thousand" are brought to the setting-up-line position when required, and are under the control of adjoining numeral-wheels at the left hand. Thus when 600 00 is set up by the typewriting machine to the computing elements, the denominational unit position of the "6" will be established by the associated printed ciphers to set up the type-wheels 111ᶜ in proper order, but in the series of wheels 111, the word-wheel "hundred" must be brought into printing position not by the ciphers but by the adjoining wheel carrying the "6". The rack 106, operating the numeral-wheel to the left of the "hundred" wheel, Figure 3, has a pin 114 set into the face thereof that interlocks with a similar pin 114ᵃ projecting from the face of the rack 106ᵇ operating its "hundred" wheel, Figures 3, 14 and 15. Hence if the rack 106 is moved rearwardly to the "6" unit position, the pin 114 will release the pin 114ᵃ to the action of a spring 118 to automatically move the "hundred" wheel 111ᵃ one space to the setting-up line to supersede the blank type unit. By adjusting a second pin 115 on the opposite side of the rack-bar 106ᵇ that is under the control of two oppositely-disposed arms 116 and 116ᵃ pivoted to a bracket 117 on the base and having distended arms connected by the spring 118 to draw the arms 116 and 116ᵃ together against a pin 117ᵃ in the bracket 117, said rack 106ᵇ will move from the position of Figure 6 to that of Figure 14, and the associated wheel 111ᵃ will rotate one unit distance to bring the word "hundred" automatically to the setting-up position, and upon the return stroke of the rack 106 the pin 114 will pick up the pin 114ᵃ and swing the word "hundred" back to inoperative or non-aligning position. The wheel carrying the word "thousand" operates in a similar manner, and while the "dollars" and "cents" wheels are also shown provided with spring-pressed fingers 116 and 116ᵃ, their function is entirely different, as will presently be seen.

119 indicates a driving shaft having end bearings within the brackets 113 and operated by a crank-arm or operating lever 120 secured to one end of the shaft to pass upwardly through a gap between the two frames and the free end provided with a handle 120ᵃ. This arm 120 swings between two adjustable stop positions, indicated at 121 and 121ᵃ (Figure 10) as set-screws threaded through ears on a bracket 122 secured to the base adjacent the lever, said bracket formed with fine arcuate V-teeth 122ᵃ across the upper edge to cooperate with a two-way spring-pressed dog 123, pivoted to said lever to overhang the toothed edge of the bracket to force a full stroke of the lever in both directions when once started, commonly known as a full-stroke mechanism.

The drive shaft 119 is approximately directly under the wheel shaft 112, and, at a point where a gap is formed between the series of word-wheels 111ᵃ and the series of numeral-wheels 111ᶜ, a cam 124 is secured to the shaft 119 to operate a short arm 125 of a lever 126 secured to a shaft 126ᵃ supported by two ears formed at the side edges of a bracket 127. The lever 126 is bifurcated to engage with a stud 128ᵃ on a short crank-arm 128 secured to a rock-shaft 129 that extends across the machine under the whole series of rack-bars 106, 106ᵃ and 106ᵇ where the ends take bearings within upright ears 129ᵃ rising from the base-plate. Referring to Figure 3, it will be noted that the racks 106 and 106ᵇ occupy grouped positions, due to the wide word-wheels on the shaft 112, and each group is provided with individual aligning elements, which though separated as separate units all operate in unison to bring the whole series of nineteen word and numeral wheels into a straight line during the printing operation as follows: A pair of arms 130 have hubs that are pinned to the shaft 129 and the upper ends of both arms are pivotally connected to one end of links 131 that extend forwardly at either side of each group of bars 106 and 106ᵃ, and the free ends are joined by two tie-rods 132, spaced relatively to each other a dimension equal to the pitch or the distance between two adjoining teeth of the racks 106 and normally raised above the racks by a spring 133 secured between a short arm of each link 131 and an ear on each arm 130. The forward upper ends of the links have a cam face 131ᵃ operative to co-act with a round nose cam-bar 134 fixed at each end to the brackets 113 to overhang the whole series of links 131. From this description, it will be seen that when the lever 120 is drawn forward the shaft will rotate, and at a predetermined point (Figure 21) the cam 124 will pick up the crank-arm 125 to vibrate the arm 126 downwardly to rock the shaft 129 and cause all the links 131 to move forwardly, and through the abutment of the stationary cam-bar 134 against the advancing cam-faces 131ᵃ, the links 131 will be forced downwardly against the tension of their springs 133 and this downward movement is so timed that the two cross-rods 132 will drop between adjoining teeth of the racks 106 to bottom therein, and as the forward movement of the links continues the cam-bar 134 will ride over the upper straight edge of the links and effectively lock the rods within the teeth of the racks (Figure 22) during the remainder of the movement, and the cam 124 will enter upon a dwell-face on the crank-arm 125 to the end of the stroke of the arm 120. This interlocking between the rods 132 and the teeth of all the racks causes said racks to move forwardly in unison therewith to vibrate the whole series of wheels a predetermined number of unit distances, and at the same time correct any positional variation in the wheels by forcing them individually into alignment. As previously set forth, each number-wheel 111 has eleven printing units and the associated gear has eleven teeth, which provides for comparatively large teeth and a proportional wide gap between the teeth of the co-operating rack-bars 106, and enables a fairly large rod to be employed to withstand the strain of operating the racks and wheels.

Directing attention to Figures 1, 4 and 6, the casing of the check-writer may be divided into three sections, the base "A", the enclosing casing "B" and a hood "C" that covers the printing elements. The hood and casing are formed with interlocking lugs 135 pivotally tied together by a fulcrum-rod 135$^a$, and the hood may be locked down at the front side by eyebolts 136 pivoted to the casing and positioned at each side to pass within the slots of two ears 137 projecting from the hood and be clamped to the casing by thumb-nuts 136$^a$. The hood is formed with end walls that provide bearings at each end for a shaft 138 as by partially entering the hubs on the inside of the hood and secured to the hood at each end by screws 138$^a$ in such a manner as to prevent rotation of the shaft. Upon this stationary shaft 138 and within the hood a check-carrier 139 is mounted, comprising a cylinder or tubular section with heads at each end having interior and exterior hubs to provide a long wearing surface on the stationary shaft. The tubular section is formed with two longitudinal slots 140 and 140$^a$ extending from head to head with a short bridge section 140$^b$ between what corresponds to the gap between the series of word-wheels 111$^a$ and the series of numeral-wheels 111$^c$, and indicates an unused section of the amount line of the check. A U-shaped channel-piece 141 has side flanges secured to the inner face of the cylinder, with side walls that align with the edges of the slots and provide a continuous housing on three sides for a series of platen-sections 142 that normally are flush with the periphery of the cylinder. Each platen-section 142 has two shouldered studs 142$^a$ that pass from the lower face of the platen down through a clearance hole in the adjacent wall of the housing, where the free ends terminate at a large head 142$^b$ that is flat on the side towards the housing to receive the forked ends of a spring comb-bar 143 secured to the inner face of the cylinder. Within the rotary field of each stud 142$^a$, a cam 144 is fixed to the stationary shaft 138 at a predetermined point, and the lower ends of the studs 142$^a$ contact with their respective cams 144, and the associated platen-sections are raised above the periphery of the cylinder and held there by a dwell on the cam for a predetermined interval and then ride off the cam and are restored by the individual springs 143 to bottom within the housing with the outer faces of the platen-sections flush with the face of the cylinder.

To transfer a rotary movement to the cylinder 139, the operating shaft 119 carries a gear 145 at each end that is in mesh with a pinion 146 fixed to a flanged hub 147 rotating freely on the shaft 138 and carrying a pawl 148 pivoted thereto, Figure 7, that is urged toward the shaft by a spring 149 secured to said flange. The pawl 148 interlocks with a disk 150 having a single tooth formed in the edge thereof and secured to the hubs of the cylinder by a pin 151. The forward movement of the arm 120 swinging between its two stop positions 121 and 121$^a$ rotates the cylinder 139 through one complete revolution or cycle through the forward movement of the pawl 148 driving the disk 150, and, when the movement of said arm is reversed, the pawl will leave the disk 150 and cylinder 139 at a position where the pawl will re-engage the disk at the end of the return stroke; hence the carrier 139 makes a complete cycle on the forward stroke and remains inactive during the full return stroke of the arm 120.

The check-carrier has two leading-edge-aligning stop-pins 152 which are carried on the ends of two flexible flat springs 152$^a$ secured to the inner wall of the cylinder with the pins passing through clearance holes on the walls thereof to project slightly beyond the outer face of the cylinder.

A paper-deflector 153, secured to the inner end walls of the hood C, passes through an opening in the top wall with the forward end curving around the under side of the carrier 139 where the free ends overlap the edge of the front apron of the casing B, to guide the work-sheet, with portions of the deflector cut away to allow clearance for the platens 142. The check may be further guided by a side-edge gage 154 secured to the left-hand side of the deflector.

The paper-feeding means co-operating with the cylinder 139 comprises three rollers 155, Figures 1 and 6, which bear against the face of the cylinder 139 in front of the printing wheels 111, and which may be flexibly mounted individually upon a rock-shaft 156 that has bearings at the side walls of the casing, the free right-hand end passing through the casing and provided with a finger-piece 157 to release all three rollers from pressure against the cylinder face when desired.

Another feeding element, intermittent in its operation, comprises three rolls 158 mounted for rotation upon a rod 158$^a$ fixed at both ends to side arms 159, which in turn are secured to a rock-shaft 160 journaled in the brackets 113, the rolls being urged through openings in the deflector 153 toward the cylinder 139 by a spring 160$^a$. Were the rolls normally in contact with the cylinder 139 and a sheet of paper inserted therebetween with nothing to force it inwardly except its own weight, the rotating of the cylinder might effect an immediate grip on the paper, or the grip might be delayed an instant and change the writing-line position, or the grip might first take effect at one corner and result in an angular entry, or the paper might not enter at all. All these uncertain features would disfigure a semi-finished check. To obviate these uncertain factors, the feed-rolls 158 normally are cammed away from the face of the cylinder and the insertion of the check allows the leading edge to pass between the cylinder 139 and rolls 158 to the position of the stop pins 152, and the initial movement of the cylinder releases the rolls 158 to be spring-pressed against the face of the check to the rear of the leading edge, and hence a positive gripping feed of the check through the printing wheels is effected. To this end a cam-plate 161, Figure 7, is secured at the left-hand end of the cylinder between the head and the disk 150 that engages the inner end of the adjacent arm 159 at the end of the forward stroke of the arm 120, which provides an entering space between the rolls and the cylinder, and at the initial forward stroke of said arm 120 the rotation of the cylinder in the direction of the arrow in this figure will release the rolls to the action of the spring 160ª and paper-feeding will take place immediately. The forward movement of the crank-arm 120 conveys a full revolution to the cylinder 139, and near the end of the forward stroke of said crank-arm the cam-plate will force the rolls 158 to the inoperative position of Figure 7. The check has been printed and if the movement of the cylinder does not eject the check, there is nothing to prevent it from being withdrawn by the hand except the pressure from the rolls 155, which may be released by the finger-piece 157 and the check withdrawn. It will be noted that the rolls 155 are positioned to engage at the two edges of the check and that the middle roll is positioned to the blank space between the two series of type-wheels; otherwise the middle roll would track through the printed line and smear the check.

The inking elements consist of a roller 162 made up in sections that rotate freely upon a rod 163 carried by two side arms 164 that are fixed to the end of a rock-shaft 165 journaled in the two outer brackets 113. The arm 164 at the right-hand end, Figure 12, has a finger 164ª that enters the sweep of a cam-plate 166 adjustably secured to the adjacent head of the cylinder 139 by a screw 166ª passing through an elongated hole in the plate and threaded into the cylinder head, providing means to advance or retard the cam, for purposes presently to appear. The rolls provide ink for the type-faces of the printing type-wheels, and, as shown at Figure 3, the sections are arranged for the grouping of the type elements to provide ink of one color for the numeral-wheels and ink of another color for the word-wheels, or they may all be of a uniform color if desired. The rolls 162 are comparatively small in diameter and made of felt, and their capacity for saturation is limited; hence an ink-supply roller 167, also of felt and made up in sections, is carried by a shaft 168 journaled in the two end brackets 113. The rolls 162 are urged towards the larger rolls 167 by a spring 164ᵇ connected between a spring stud on the arm 164 and a similar stud on the bracket 113 at each side, and when the rolls 167 are rotated by the shaft 168 the rolls 162 roll over the surface thereof and a uniform density of ink is maintained in the smaller roll. To provide a rotary movement for the shaft 168 and its rolls 167, one end of said shaft outside of the bracket 113 may be provided with a toothed ratchet-wheel 169, Figures 18 and 19, enclosed on two sides by disks 169ª to retain and guide a ratchet-toothed rack-bar 170 pivotally connected to the face of an arm of the gear-sector 145 and engaging the wheel 169 in one direction by its own weight and riding over said wheel to follow the fixed radial movement of its pivot in the sector. When the sector moves forward, the bar 170 rides over the teeth of the ratchet-wheel 169, but on the return stroke the rack teeth will interlock with the teeth of the wheel and convey a rotary movement to the shaft 168 and roller 167, which in turn will rotate the rolls 162 through surface contact influenced by the springs 164ᵇ.

The numeral-wheels 111 have eleven printing units distributed around the rim of the wheel at uniform distances; one unit for each of the numbers "0" to "9" and one blank surface-mutilating unit. The surface-mutilating unit of each number-wheel is normally positioned at a setting-up line position, where any and all of the selected type-faces are prematurely grouped and subsequently advanced to the printing position as a whole-line-unit. As every check made out is in dollars and cents, these two words may be in permanent alignment with the surface-mutilating units, but the two word-wheels for "hundred" and "thousand" have a surface-mutilating or blank unit in alignment with this setting-up line position when the amounts selected are below their denominational value. Every check that is printed employs the whole linear series of printing elements that cover the entire length of the amount line, and when an amount in numerals and words is selected by the adding elements these selected units displace corresponding surface-mutilating blank units, and hence such portions of the amount line not used by the amount units in numbers and words will be destroyed by the blank units to prevent the surface from being used a second time to make any changes in the original line of print. To print the entire length of the amount line simultaneously and at a single operation with stationary inked paper-mutilating type-faces on the face side and co-operative stationary mutilating platens on the opposite side of the check, would require more hand power than a manually-operated office appliance should have. Furthermore, such surface-mutilating elements do not actually shear their way through the paper, but tear or shred the surface, and by applying ink to the raw edges of these tears or rents, it makes it more difficult to remove the ink by any form of eradiator. To promote an easy printing operation, instead of bringing the whole longitudinal face areas of the types by direct pressure against the check at the same instant, the check is rolled between rotatable mutilating elements and a shearing effect is obtained which greatly reduces the power required at the operating crank-arm 120.

Referring to Figure 16, it will be noted that the platen-sections 142 have transverse sharp V-cutting teeth throughout their length, and that these teeth align with V-grooves cut across the type-faces, indicating in this figure the letters cents. As the type-faces are printing faces, a flat type-face section is preserved between each V-groove as an ink-carrying surface. As the type-wheels 111 and 111ª are mounted upon the shaft 112 for a free running fit without unnecessary end motion, it would be practically impossible to cut a continuous platen-bar with V-teeth that would align perfectly with the grooves in the whole series of wheels 111; hence the platen-sections 142 are provided with slight endwise movements, as indicated by heavy lines for a slight clearance space between adjoining platen-sections at Figure 4, which permit the teeth of the individual platen-sections to adapt themselves to the grooves in the wheels for cutting alignments.

The operation of this combination machine is as follows: A blank check 153ª, shown at Figure 17, is adjusted to the typewriter platen 34 and the date indicated at "*a*" is typed; the payee's name entered at "*b*" and the amount "*c*" of the check typed on the same line as shown. In printing the amount "600 00", the numeral-keys 25 on the typewriter depress the fingers 62 that operate the rock-shafts 64 to depress their bars 66, which in turn depress the underlying index-pins 61 in their respective index-bars 50. The crank-arm 83 is drawn forwardly, and the cross-bar 80 will move forwardly and pick up these pins that have been depressed and move their associated indexing-bars in unison therewith to the end of the stroke as their denominational positions may indicate. One index-pin will be moved through seven units of space and will move its associated indexing-bar through six units to set up the six position on its index wheel. The other four depressed index pins will move through one unit distance and not affect their index-bars 50. The movement of the first pin through seven unit spaces will carry its rack-bar 98 the same distance, and rotate its pinion 100, shaft 101 and the two pinions 105 and 105ª to move the racks 106 and 106ª a seven unit distance to rotate their numeral-wheels 111 and 111ᶜ to bring the numerals "6" to the setting-up-line position, one numeral "6" before the word "hundred", whose wheel has been released, and one at the denominational hundreds position in the wheels 111ᶜ. Printing the four ciphers will set up four pins 61, and near the end of the stroke of the crank-arm 83 the bar 80 will pick up these four pins and move them one unit distance by moving their shuttles 96 and not disturbing their racks 50; and this one unit movement of these four shuttles will rotate their shafts 101 to move the racks 106 and 106ª to cause ciphers to supersede the mutilating units in the setting-up line position.

The denominational position of the "6" is hundreds, and the rack 106, in moving rearward through the first unit distance, will release the rack 106ᵇ to the action of the spring 118, and the pin 115 will move from a position shown at Figure 6 to that of Figure 14, where the rack is arrested and locked by the stud 115 between the two arms 116 and 116ª, which automatically shifts the surface-mutilating blank type-face to bring the word "hundred" into alignment with the setting-up position, and, as already described, the setting up of an amount in the word line simultaneously sets up numerals in the second group 111ᶜ at the end of the line. Hence at the end of the operation up to this point the "600 00" has been added to the register wheels and "6 hundred dollars 00 cents" has been set up at the setting-up position of one series of check-printing wheels, and "600 00" at the series of numeral wheels 111ᶜ.

The check is removed from the typewriter and adjusted to the check-writer with the top edge down and the printed face to the rear against the deflector 153, with the left-hand edge against the gage 154 and the leading edge resting against the stop-pins 152. The crank-arm 120 is drawn forward from the position of Figure 6 to that of Figure 20, and during the initial movement of the crank the roller 158 has passed from the control of the cam 161 and is spring-pressed against the face of the check. A further forward movement of the crank brings the several operative parts into co-operative positions, as shown at Figure 21, where the cam 166 has vibrated its ink-rollers 162 from the supply-roller 167 to bear against the leading edges of all the type-faces at the set-up line indicated at "X"; the cam 124 has moved the arm 125, rock-shaft 126ª and the connecting parts to force the two rods 132 into a locked-down engagement with the teeth of the whole series of bars 106 and 106ᵃ; the cutting platen-blocks 142 have passed over the individual cam-members 144 adjustably secured to the stationary shaft 138; and the cutting faces have been raised above the surface of the cylinder, as shown at Figure 21. From this point through the interlock of the rods 132 within the teeth of the rack-bars 106, said racks will move in the direction of the arrow, Figure 14, to the position of Figure 15; and the wheels 111 will have a surface travel equal to the surface travel of the check bearing cylinder; hence the set-up type-line "X" and the cutting platen-blocks will advance towards each other in unison with the check between them. The type in advancing will receive a coating of ink from the rolls 162 timed to ride off their cam 166 immediately after rolling over the type-faces (Figure 12) to return to their supply-roller. As the parts are further advanced toward the position of Figure 22, the leading edges of both type and platen will meet cornerwise and readily puncture an initial cut through the check that gradually lengthens as rotation continues and develops a rotary shearing action in cutting the whole amount line that is hardly perceptible at the crank-arm, and these cutting faces assist the rolls 158 as paper-feeding elements. In passing to the position of Figure 22, the type-faces have slit the check and have been withdrawn, and the cutting platen-blocks have passed the control of the cams 144 and have returned within the cylinder 139 through the action of their restoring springs 143, and from this point on to the end of the stroke of the crank-arm 120, the check will be fed around the cylinder, and the cam 124 will swing idly over a dwell on the arm 125, and at the end of the forward stroke, the several parts will assume the position of Figure 23, where the cam 161 has raised the rolls 158 from the cylinder and the cylinder has made one complete revolution.

To prevent any possibility of the leading edge of the check adhering to the pins 152 after passing the rolls 155, a stripping plate 172 may be secured to the frame, with the edge positioned to ride over the face of the cylinder and strip the edge of the check from the pins that pass through grooves in the plate.

When the general operator has reached the end of its forward stroke against the screws 85 and the cross-bar 80 has shifted the active indexing bars 50 to register, and as the rotation of the shafts 101 sets up corresponding values in the printing wheels 111 at a setting-up line position to be subsequently advanced as a series through the printing zone, it is obvious that means must be employed to prevent the rotation of the shafts 101 from affecting the indexing bars 50, which have already registered their values at the register wheels. To this end the seven shafts are divided into two sections 101 and 101ᵃ and are joined together by a flexible coupling that will promote a joint rotation in one direction during one interval, and during another interval permit one section to remain inactive while the other advances in the same direction. To this end the shafts 101 have a direct connection to the selecting elements and the shafts 101ᵃ are connected directly to the rack 106. Each shaft 101 has a sleeve 173 secured thereto by a pin 174 with the sleeve abutting the face of the bracket 104. The inner end of the shaft 101ᵃ enters the sleeve 173 freely with the end thereof abutting the end of the shaft 101. The edge of the sleeve 173 that overhangs the shaft 101ᵃ is stepped or notched to co-act with a pin 174ᵃ driven transversely through the shaft to check the action of a spring 175 coiled about the sleeve with the ends secured between the two pins 174 and 174ᵃ. The tension of the spring is against the direction of the shaft's rotation in setting up the wheels 111, and hence must be sufficiently strong to operate the wheels without flexing. When the wheels 111 are rotated through the printing zone, their associated shafts 101ᵃ will rotate with them, and by holding or locking the shafts 101 against rotation during this interval the independent movement of each shaft 101ᵃ is absorbed by winding up the spring 175, and at the end of the printing operation these springs will restore the wheels 111 to the setting-up position.

Means to lock the seven shaft sections are shown at Figures 2, 3, 4 and 5, where a locking bar 176 is positioned over the rack-bars 98 and given a sliding parallel up and down movement, through being mounted upon screws 177 that pass through angular slots in the bar and hold the bar against the face of a cross-bar 178 and spring-pressed in one direction by a spring 179. A curved trip-arm 180 is secured at one end of a rock-shaft 181 journaled in ears on the guides 81ᵃ at each side frame, and provided with a spring 182 to urge the end of the trip-arm 180 against the edge of the bar 77. The rock-shaft 181 carries an arm 183 that extends rearwardly over the upper edge of the locking bar 176 and also the seven bars 60 for purposes presently to be described. At Figure 5, the rack-bar 77 of the general operator always has a uniform forward movement, and the edge thereof adjacent the end of the overlying end of the trip 180 is cut away, as at 77ᵃ, a distance a little less than the movement of the bar, so that just before the bar has reached the end of its forward stroke the rear wall 77ᵇ of the cut-away portion will cam the end of the trip 180 and cause it to ride to the higher edge of the bar, causing the arm 183 to drop and press upon the top edge of the slide 176 and depress the lower edge into locking engagement between two adjoining teeth of the whole series of racks 98, and these racks will be locked against movement from the rotation of the shafts 101ᵃ in both active and inactive positions.

By referring back to the check, Figure 17, it will be noted that in printing the date "a", the numerals register within the columnar zone predetermined as the active zone of the sectors for denominational units by the adjustment of the stop 48 to the stop bar 49, and hence the printing of any figures for any purpose within this zone would cause addition to take place at the register wheels. To offset this action, Figure 2, a push-key 184, through the front wall of the typewriter frame, traverses the machine where the rear free end is pivoted at 184ᵃ to the lower end of a bell-crank 185, swinging about a pivot 186 with a short arm 185ᵃ carrying a stud 187 to engage with an arm 188 that rocks a shaft 189 and arms 189ᵃ carrying the roller 54 between them. By pushing in the key 184, the roller 54 is shifted out of the path of the rollers 54ᵃ on the selectors 52, and the carriage may be moved freely through the adding zone and the selectors will remain inactive. A pin 191 projecting from the push-key 184 out through a slot 192 in the side frame will lock the key indefinitely in a pushed-in position by dropping back of a shoulder 193 formed in the slot, as shown and described in the aforesaid patent to Hart.

On the return stroke of the crank-arm 120, the rack 170 rotates the in-supply-roller 167. Figure 18: the pawls 148 draw back idly over the disk 150 leaving the cylinder 139 at rest, and when the cam 124 releases the arm 125 the springs 175 will rotate the shafts 101, pinions 105 and move the racks 106 forward, carrying the tie-rods 132 with them until released by the cross-bar 134. This movement is timed to arrest the pin 174, Figure 8, striking the shoulder in the edge of the sleeve 173, which restores the shaft 101ᵃ to the control of the shaft 101. The further return movement of the crank-arm 120 is without effect except to rotate the ink-supply-roller 167 and drop the pawl 148 within the tooth of the disk 150 at the end of the stroke.

The crank-arm 83 is now moved to the rear. The initial movement drops the trip-arm 180 into the slot in one rack-bar 77 of the general operator and raises the arm 183 to the position shown at Figure 5, which releases the locking bar 176 to its spring, to withdraw the bar from the teeth of the still stationary racks 98. The forward toothed section of the bar 77, which is in train with the gears 86 and 87, will rotate the transferring elements 73 to co-operate with any pinion 75 that has moved into their field during the forward stroke of the rack 50 for a carry-over register. As the forward movement of the bar 80 first picked up the pin-carrying shuttles for an independent movement of one unit dimension before the shuttles conveyed any movement to their bars 50, similarly on the return stroke of the general operator the cross-bar 79 will first pick up the pendent arm 97 of any active rack 50 and move the pin-carrying shuttle one unit space to the rear and then convey a rearward movement to the bars 50 to their stop positions against the comb-plate 51. Near the end of the return movement of the general operator, the dog 94 will vibrate the cam-arm 93, rod 88 and arm 92 to lift the plate 91 against the lower ends of any depressed indexing pins 61 to force the pins upwardly to an inactive position above the field of the bar 80, and then drop the cam-arm 93 to restore the plate 91. While these restoring movements are taking place in the adding base, the shafts 101 and 101ᵃ and pinions 105 will restore the racks 106 and rotate numeral-wheels 111, and near the end of the return stroke of the racks 106, such racks that are provided with pins 114, will engage with the pins 114ᵃ on the rack controlling the "hundred" and "thousand" wheels, and move these wheels one unit space removed from the setting-up line position. The racks controlling the two wheels for "dollars" and "cents" are restored by their arms 116ᵃ, Figure 15, forcing the stud 115 to the normal position shown at Figure 14, and bringing the two words into alignment with the setting-up line.

With all machines of this character, provision has always been made for an operating crank-arm that shall be spring-pressed on the return stroke, requiring a dash-pot or some other form of retarding element to check the destructive force of this spring on the complicated mechanisms. A conspicuous feature in this invention is the absence of these springs. After the setting up of the indexing pins, the crank-arm 83 is moved forwardly until checked by the general operator striking its stops, and the lever is left in this forward position. The check is removed from the typewriter and adjusted to the adjoining check-writer, and the crank-arm 120 moved forwardly against its stop 121ᵃ, which prints and ejects the check, and the lever movement is immediately reversed not by a spring, but by a manual operation, against its normal stop 121, a full continuous movement thereof in both directions being assured by the full-stroke interlocking dog 123. The crank-arm 83 is then manually restored to its normal position against a fixed stop 190 (Figure 2) on the side wall of the frame.

From this description it will be seen that blank checks may be adjusted to these combined mechanisms to be typewritten for date, payee's name and amount; the amounts successively registered at a series of adding accumulator wheels and the amounts finally printed in both words and numerals on the check by indelibly-inked, paper-shredding, type-faces, interchangeable with blank-surface mutilating elements that fill in the remainder of the amount line; that a manipulation of the numeral-keys sets up a selective mechanism, an operating lever registers digit units to the adding accumulator wheels predetermined by the denominational value printed, and simultaneously sets up equivalent values at two series of check-printing type-wheels; that the selective mechanism at each operative period rotates the adding accumulator wheels a predetermined number of digit unit distances of one to nine, and simultaneously rotates type-wheel printing elements unit-distances of one to ten; that the type-printing wheels are prematurely assembled at a normally inoperative printing position, and subsequently carried as a longitudinal unit through a fixed printing zone predetermined by a cooperating normally inoperative cutting platen movable with a rotary check-carrying cylinder, making one complete revolution at every check-printing operation; that the type-inking means comprise an ink-supply roller and an ink-distributing roller that is so timed that ink is supplied only to such type-faces that are active in the next printing operation; that the inking rollers are assembled in sections, and each alternate section saturated with a different colored ink to give a contrast between the printed numerals and the printed words on the check; that the computing and check-writing mechanisms may be cut out at will and the typewriting elements used separately; that the typewriting and computing mechanisms may be employed for a joint cooperation in typewriting and computing operations, while the check-writing elements remain inactive, except for a free rotary movement of the type-wheels between normal and setting-up positions; that the indexing pins are mounted in a carrier that has a free to-and-fro movement of one-digit dimension between fixed stop positions at the side of each digit-bar; that the general operator will pick up an active index-pin and move the pin-carrier and the racks 106 one unit distance, and then pick up the bars 50 to move in unison therewith to the end of the forward stroke; and that on the return stroke of the general operator all the active index-pins will first move the racks 106 rearwardly one unit distance and then pick up the bars 50 and all the active racks 106 will be restored in unison to normal positions.

It will also be noted that the cutting faces of the type-wheels that pierce the face of the check, through a rotary movement beyond the cutting zone, automatically strip the cutting faces from the check by rolling out of the rotary field of the check-carrier, and simultaneously the cutting platen-sections are automatically restored within the check-carrier before the printed amount line passes beyond the front pressure rolls that hold the check against the carrier, and hence the inked cut-through sections of the denominational values and the surface-mutilating blank areas present clean-cut edges, and there is no tendency to tear out small divisional sections through the papers sticking to the cutting faces during the operation of stripping the check from the cutting type-faces common to some machines employing the shredding method.

Particular attention is called to the hinged hood-section "C" that may be swung back against stops to give easy access to the type-wheels for cleaning purposes, or for supplying ink to the supply rollers when required and that by turning the check-carrying cylinder by hand the cutting platen-sections may be rotated to a position to be cleaned by a brush, and then restored and timed correctly through the adjustment of the disk 150 to the driving pawl 148; and the wheels 111, as a series, may be rotated step by step by first setting all the "9" digit-pins, and then pulling the arm 83 slowly forward to successively rotate the ten cutting type-faces of each wheel through a position accessible to a cleaning brush.

It will be noted further that when the numeral keys set up index-pins for digit values in numerals, and these values are transmitted simultaneously to adding registers and numeral-printing wheels, this transmission to the adding wheels registers full denominational values, but in transmitting the values to the printing wheels these values are set up on numeral type-wheels without regard to denominational positions, and the active cutting type-wheels denote their denominational values by automatically bringing the denominational words "hundred" or "thousand" into printing alignment, and while the words "dollars" and "cents" are shown and described as fixed units in the setting-up line, it will be understood that these two wheels may be arranged to move in and out of the setting-up line similar to the words "hundred" and "thousand", in which case the normal setting-up line will present a continuous line of surface mutilating blank cutting elements; and that in adjusting the blank check to the rear of the check-carrier against fixed stops in advance of the feed-roll position, said feed-rolls become operative at such a time and in such a manner as to prevent any possibility of the check skewing out of proper alignment; said rolls becoming both feeding and paper-gripping elements to hold the check in proper relation to the rotary check-carrier.

It will further be noted that when the blank check is adjusted to the typewriter, the first period consists in printing the typewritten matter, and without changing the carriage position, the check is removed from the platen. At the second period the left hand draws the arm 83 forward to the stop position and is held there while the check is adjusted to the rear of the check-carrier. The third period consists of moving the lever 120 forwardly and backwardly between stop positions to print the check and eject it; and the last period consists in moving the arm 83 rearwardly to restore the computing elements to normal positions. Thus the check, complete in every detail except for the signature, is typewritten, the amount registered, and the amount unchangeably shredded into the fabric of the check by these three combined mechanisms, a typewriter, a computing machine and a check-protector writing machine.

It will be noted that the numeral and word type-wheels are selectively rotated to a premature setting-up line position indicated as $x$ in Figure 6, and the set-up type-faces are then rotated as a longitudinal unit to the position of $x$ in Figure 22, and the arc traversed by the types between these two $x$ positions will indicate a printing zone, and the phrases, setting the wheels for a printing assemblage, to a printing zone, and to a setting-up line, all refer to the normal position $x$ of the type-face of Figure 6.

The extreme left-hand "hundred" and "thousand" word type-wheels 111ª (Figure 4) are normally positioned to shred the check when the amount printed thereon is less than $100. If a check is to be made out for $100 or more, say $600, the numeral "6" is set up on a numeral-type-wheel 111 and adjacent this number the word-wheel 111ª is set up to print the word "hundred". The word "hundred" on the word-wheel is only brought into use when its numeral-wheel 111 is set to print a number. To this end, the word-wheel is placed under the control of a spring 118 (Figure 3), but is prevented from being operated through the pins 114 and 114ª on the rack-bars 106 and 106ᵇ, respectively, as long as its adjacent numeral-wheel 111 is in normal position. However, as soon as the rack 106ᵇ advances to set the numeral-wheel 111 for printing a number, the pin 114 moves away from pin 114ª, and thereby permits the spring 118 to rotate the word-wheel 111ª by operating the arm 116 and the rack 106ᵇ. This rotating sets the word "hundred" on the word-wheel to printing position. The return of the numeral-wheel 111, together with the rack 106, will return the rack 106ᵇ and retension the spring 118, thereby returning the word-wheel to its normal position.

After all the printing wheels are set, the lever 120 is operated manually, to rotate the check-carrier 139 through a complete revolution. This check-carrier carries the platen-sections 142, which are normally out of working position. During the rotation of the check-carrier, the platen makes a printing stroke, and is cammed out to engage the printing wheels 111 and 111ª. Concomitantly means, under the control of the lever 120, starts to rotate all the wheels 111, 111ª together with the check-carrier 139 and platen 142. In this manner the printing wheels will engage the platen while passing through the printing strokes, to shred the check. Further rotation of the platen and wheels disengages them, and the platen rides off from its operating cam and returns to normal ineffective position, while upon return movement of the lever 120 the typing wheels are returned to their normal positions.

Variations may be resorted to within the scope of the invention, and portions of the improvements may be used without others.

Having thus described my invention, I claim:

1. A check typing, printing and adding machine including a single series of typing, printing and adding numeral-keys, types responsive to said keys for typing an amount upon a check, means for supporting the check while being typed, 10-step indexing mechanism responsive to said keys, a series of settable check printing devices selected by and co-operatively associated with said indexing mechanism, a second supporting means for holding the check during the printing operation, adding mechanism also co-operatively associated with said indexing mechanism to be operated 9 steps thereby for adding the amounts typed upon the checks, means for cycling said check-printing devices and the adding machine concomitantly, and means for subsequently subjecting the check to the action of said printing devices while the adding machine is stationary.

2. The combination of mechanism for typewriting the amount upon a check, 10-step digit and zero indexing mechanism operatively connected thereto, adding mechanism including a set of register-wheels and individual rack-bars therefor movable to points predetermined by the indexing mechanism in typing the amount, check-protecting mechanism including reprinting devices settable by the rack-bars, means for subsequently employing the wheels for reprinting the same amount separately upon the check, while the rack-bars are stationary and means operable to automatically lock all the register-wheel-rack-bars at the end of the wheel-setting operation, to prevent movement thereof during the subsequent check-reprinting operation.

3. The combination of mechanism for typewriting the amount upon a check, mechanism for adding the amount typed including a general operator, a set of racks and a set of rack-driven register-wheels, mechanism for imprinting the amount separately upon the check, said imprinting mechanism including a set of racks and a set of rack-settable type-wheels, means, including flexible driving connections between the register-racks and the type-wheel racks, to enable the general operator to impart one extra step of movement to the type-wheel racks, and enable the register-racks to rotate the type-wheels to the points selected, means to rotate the type-wheels thereafter to effect printing, and locking means for holding said register-racks stationary during the printing rotation of the printing wheels.

4. A check drawing, adding and protecting mechanism including the combination of a typewriting mechanism having a single set of numeral-keys, said keys having elements to type the amount upon a check, a computing mechanism including digit and zero indexing bars set up by said numeral-keys at their amount-typing operation, and also including a register, a general operator to pick up the set-up index-bars and drive the register from one to nine steps in each denomination, a check-protecting mechanism including numeral-printing type-wheels and wheel-driving racks, means for transmitting the movement of each driven indexed bar to drive the corresponding printing-wheel rack from one to ten steps, whereby at the registering of the number typed by said keys, there is jointly set up a check-protecting amount-printing array of the type-wheels, and means for subsequently effecting an impression of the amount on the check by means of the set-up wheels.

5. The combination with a typewriting machine including a single keyboard having elements to type the amount on a check, of digit and zero indexing mechanism set up by said keyboard in typing the amount, adding mechanism controlled by said indexing mechanism, racks, a general operator to operate said racks from one to nine steps each, thereby to register the amount typed, a check-protecting mechanism including numeral-printing type-wheels having wheel-driving racks, two-part transmission shafts connecting the indexing mechanism to drive from one to ten steps the corresponding numeral type-wheel driving racks, so that the registering of the number type will set up the wheels for a printing array in numerals corresponding to the number typed and computed, yieldable means joining the two-part transmission shafts, and means to effect an additional step of rolling impression movement of the type-wheels to reprint the typed amount of the check while the indexing mechanism is stationary.

6. The combination with a single keyboard, of mechanism controlled thereby for type-writing the amount upon a check, 10-step digit and zero indexing mechanism operatively connected to said keyboard, adding register-wheels controllable each to the extent of only 9 steps by said indexing mechanism, racks for the register-wheels, check-protecting printing mechanism operatively connected to be set up according to said indexing mechanism preparatory to reprinting the typed amount separately upon the check, the reprinting mechanism including rack-bars and a series of check-protecting type-wheels individually rotated by the rack-bars, mechanism operatively connecting the register-wheel rack-bars with the type-wheel racks to set up check-protecting values to be subsequently printed upon the check by said type-wheels, and manual means for rotating the set up check-protecting amount-line through a check-protecting zone while said indexing mechanism is stationary.

7. A check drawing, protecting and adding machine including a single series of check-typing, check-protecting and check-adding numeral-keys, types responsive to said keys to print the amount upon the check, means for presenting the check to said types, 10-step indexing mechanism responsive to said keys, a series of settable check-protecting devices co-operatively associated with said keys through said indexing mechanism, means for causing the check-protecting devices selected by said keys to act upon the check, while said indexing mechanism is stationary, separate means for presenting the check to the protecting devices, and 9-step adding mechanism co-operatively associated through said indexing mechanism with said keys for adding the amounts typed upon the checks.

8. A check drawing, protecting and adding machine including a single series of check-typing, check-protecting and check-adding numeral-keys, types responsive to said keys to print the amount upon the check, means for presenting the check to said types, denominational selecting and indexing mechanism responsive to said keys, a series of settable check-protecting devices co-operatively associated with said keys through said indexing mechanism, means for causing the check-protecting devices selected by said keys to act upon the check, separate means for presenting the check to the protecting devices, an adding mechanism co-operatively associated through said indexing mechanism with said keys for adding the amounts typed upon the checks, a general operator associated with the indexing mechanism, and means for driving the check-protecting devices each one more step than the corresponding concomitantly-driven adding devices.

9. A check drawing, protecting and adding machine including a single series of check-typing, check-protecting and check-adding numeral-keys, types responsive to said keys to print an amount upon the check, denominational selecting and indexing mechanism responsive to said keys, a series of settable check-protecting devices co-operatively associated with said keys through said indexing mechanism, means for causing the check-protecting devices selected by said keys to act upon the check, an adding mechanism co-operatively associated through said indexing mechanism with said keys for adding the amounts typed upon the checks, a general operator associated with the indexing mechanism, and means for driving the check-protecting devices each a greater distance than the corresponding adding device, whereby the number of characters set up on the check-protecting devices may exceed the movements given to the adding mechanism.

10. A check drawing, protecting and adding machine including a single series of check-typing, check-protecting and check-adding numeral-keys, types responsive to said keys for printing the amount upon the check, indexing mechanism responsive to said keys, a series of settable check-protecting devices co-operatively associated with said keys through said indexing mechanism, an adding mechanism co-operatively associated with said keys through said indexing mechanism, for adding the amounts typed upon the checks, means for initially driving the check-protecting devices each a step in advance of the driving of the adding mechanism, and means for causing the check-protecting devices to act upon the check.

11. A check drawing, protecting and adding machine including a single set of ten typing and adding check-protecting digit and zero keys, types responsive to said keys to enter an amount upon a check, means for presenting one portion of the check to the types, denominational selecting and indexing mechanism responsive to any of said keys, and inclusive of means for indexing digits and zeros, a series of settable check-protecting devices co-operatively associated with said indexing mechanism, and including digit and zero devices, an adding mechanism co-operatively associated with only the digit-indexing means of said indexing mechanism, for adding the amounts typed upon the checks, means including a general operator co-operative with the digit and zero indexing mechanism to set up the digit and zero check-protecting devices, said general operator effective to advance said protecting devices one step in advance of the adding mechanism, and also effective to drive the adding mechanism, and separate means for presenting another portion of the check to the check-protecting devices.

12. A check typing, protecting and adding machine including a single set of ten typing and adding check-protecting digit and zero keys, types responsive to said keys to enter an amount upon a check, means for presenting one portion of the check to the types, indexing mechanism responsive to all of said keys, a series of settable check-protecting devices including digits and zeros in the different denominations, co-operatively associated with said keys through said indexing mechanism, separate means for presenting another portion of the check to the protecting devices, means for causing the selected digit and zero check-protecting devices to act upon the check, an adding mechanism co-operatively associated with only the digit-indexing means of said indexing mechanism, for adding the amounts typed upon the checks, a carriage-operated denominational selecting mechanism controlled by the keys, a general operator associated with the denominational selecting and indexing mechanism, means co-operative with the general operator to set the digit and zero check-protecting devices each from one to ten steps, a set of connections to enable said adding mechanism to be concomitantly driven from one to nine steps by the general operator, and means for automatically returning the protecting devices to normal position after operation, while the adding mechanism is stationary.

13. A check drawing, protecting and adding machine including a single series of ten check-typing, check-protecting and check-adding numeral-keys, types responsive to said keys to print an amount upon a check, denominational selecting and indexing mechanism responsive to said keys, a series of settable check-protecting devices co-operatively associated with said keys through said indexing mechanism, an adding mechanism co-operatively associated with said keys through said indexing mechanism, a general operator associated with the indexing mechanism, means, including a set of connections to the general operator, to advance the check-protecting devices each one to ten steps from normal positions to appropriate protecting positions, a set of connections to enable said adding mechanism to be driven by the general operator one to only nine steps, according to the indexing, and means to cause the check-protecting devices to act upon the check.

14. A check drawing, protecting and adding machine including a single set of ten check-typing, check-protecting and check-adding numeral-keys, types responsive to said keys to print the amount upon the check, indexing mechanism responsive to said keys, a series of settable check-protecting devices co-operatively associated with said keys through said indexing mechanism, an adding mechanism co-operatively associated with said keys through said indexing mechanism, a general operator associated with the indexing mechanism, means, including a set of connections extending to the general operator, for adjusting the check-protecting devices, and a set of connections to enable said adding mechanism to be driven by the general operator; a lost-motion device being included between the two sets of connections, for giving one set of connections one advance step of travel while the other set is stationary.

15. A check drawing, protecting and adding machine including a single set of ten typing and adding check-protecting digit and zero keys, types responsive to said keys to enter an amount in one place upon a check, denominational selecting and indexing mechanism responsive to said keys, a series of settable ten-step check-protecting devices co-operatively associated with said indexing mechanism for protecting the check in another place, an adding device including mechanism co-operatively associated with said indexing mechanism for adding the amounts typed upon the check, and means to actuate the adding mechanism and concomitantly actuate the protecting mechanism one more step than the adding mechanism.

16. A check protecting and adding mechanism including a single set of ten digit and zero typing and adding check-protecting keys, an indexing mechanism co-operative with said keys, a line of check-protecting characters normally in working position, digit and zero check-protecting devices co-operatively associated with said indexing mechanism and connected with said line of characters, a nine-step adding mechanism co-operatively associated with said indexing mechanism for adding the amount for which the check is typed and protected, means to advance the adding mechanism selectively from one to only nine steps, means for adjusting the protecting devices each one more step than the corresponding adding mechanism, and in advance thereof, to remove line-filling characters selectively from working position and set the digit and zero protecting devices as predetermined by said keys, and means to cause the protecting devices to act upon the check.

17. A check protecting and adding mechanism including a single set of ten digits and zero typing and adding check-protecting keys, an indexing mechanism co-operative with said keys, a line of check-protecting characters normally in working position, digit and zero check-protecting devices co-operatively associated with said indexing mechanism and connected with said line of characters, a nine-step adding mechanism co-operatively associated with said indexing mechanism for adding the amount for which the check is typed and protected, means to advance the adding mechanism selectively from one to only nine steps, means to enable said check-protecting devices to be adjusted selectively each one step in advance of the corresponding adding mechanism by an initial movement, and means for causing the adjusted and unadjusted protecting devices to act upon the check to produce co-operatively a full line of protection.

18. A check drawing, adding and protecting mechanism including a single set of ten digit and zero typing and adding check-protecting keys, digit and zero indexing mechanism connected with said keys, a series of settable check-protecting devices co-operatively associated with said indexing mechanism, a mechanism co-operatively associated with said indexing mechanism for adding the amounts typed and protected upon the checks, and operating means having a set of connections to adjust the check-protecting devices each from one to ten steps, and also a set of connections to drive the adding mechanism concomitantly from one to only nine steps.

19. A check drawing, adding and protecting mechanism including a single set of ten digit and zero typing and adding check-protecting keys, digit and zero indexing mechanism connected with said keys, a series of settable check-protecting devices co-operatively associated with said indexing mechanism, a mechanism co-operatively associated with said indexing mechanism for adding the amounts typed and protected upon the checks, and operating means having a set of connections to adjust the check-protecting devices each from one to ten steps, and a lost-motion mechanism for driving the adding mechanism one less step than the protecting devices.

20. A check drawing, adding and protecting mechanism including a single set of ten typing and adding check-protecting digit and zero keys, digit and zero indexing mechanism responsive to said keys, a series of settable check-protecting devices each capable of being indexed for ten working positions by said indexing mechanism, an adding mechanism co-operatively associated with said indexing mechanism and capable of being driven for only nine steps for adding the amount typed upon the check, a general operator, a set of connections to enable the same to adjust the check-protecting devices as indexed, and a separate set of connections to enable said adding mechanism to be driven by the general operator as indexed.

21. In a check drawing, adding and protecting machine, a single set of ten digit and zero typing and adding check-protecting keys, a set of ten digit and zero types controlled by said keys, a series of check-protecting devices associated with said keys and including type-wheels, a set of rack-bars to adjust the check-protecting devices, an adding mechanism including register-wheels for adding the amounts typed and protected upon the checks, a set of rack-bars to operate the adding mechanism, a general operator effective to move the sets of rack-bars predetermined unit-distances, and mechanism associated therewith intermediate the rack-bars of the adding mechanism and the rack-bars of the check-protecting devices, whereby the register-wheels may be rotated through unit-distances of from 1 to 9 and the related type-wheels through unit-distances of from 1 to 10, in a single operation of the machine by the general operator, to register similar denominational values.

22. In a check drawing, adding and protesting machine, a single set of ten digit and zero typing and adding check-protecting keys, a set of check-protecting devices associated with said keys and including type-wheels, a set of rack-bars to adjust the selected check-protecting devices, an adding mechanism including register-wheels for adding the amounts typed and protected upon the checks, a set of rack-bars to operate the adding mechanism, and a general operator for moving both sets of bars in multiples of a unit-step including means effective to transmit a movement of one unit-step to the type-wheel racks before any movement is given to the register-wheel racks.

23. In a check drawing, adding and protecting machine, a single set of ten digit and zero typing and adding check-protecting keys, a set of ten digit and zero types controlled by said keys, a series of check-protecting devices associated with said keys and including type-wheels, a set of mechanisms, associated with said keys, to set the check-protecting devices selectively, an adding mechanism including register-wheels for adding the amounts typed and protected upon the checks, a set of rack-bars to set the adding mechanism, and a driving member associated with each register-wheel-rack-bar and its related type-wheel mechanism and effective to give a predetermined free longitudinal relative movement of one unit-distance to effect a step of movement of the type-wheel racks before transmitting movement to the register-wheel racks.

24. The combination of a single set of ten digit and zero keys, mechanism controlled by said keys for type-writing the amount upon one portion of a check, mechanism operatively connected to said keys for indexing digits and zeros, mechanism including a series of ten-step digit and zero devices connected with said indexing mechanism for impressing the amount separately upon another portion of the check in the form of check-protecting numerals, means also controlled by said indexing mechanism to the extent of only nine steps for adding the amount typed upon the check, and manual means for rotating the set-up check-protecting amount-line through a check-protecting zone while said indexing mechanism is stationary.

25. The combination of a single set of ten digit and zero keys, mechanism controlled by said keys for typewriting the amount upon one portion of a check, ten-step digit and zero indexing mechanism operatively connected with said keys, digit and zero check-protecting mechanism governed by said indexing mechanism for reprinting the amount upon another portion of the check, the reprinting mechanism including check-protecting digit and zero type wheels controlled by said indexing mechanism, nine-step means also controlled by said ten-step indexing mechanism for adding the amount typed and reprinted upon the check, and manual means for rotating the set-up check-protecting amount-line through a check-protecting zone while indexing mechanism is stationary.

26. The combination of mechanism including a set of ten digit and zero keys and types controlled thereby for entering the amount upon one portion of a check, ten-step indexing mechanism connected with said keys, including unit-pin-carrying bars, register-wheels driven thereby, each bar having ten settable pins, digit and zero check-protecting mechanism controlled by said indexing mechanism for imprinting the amount upon another portion of the check, said imprinting mechanism including a series of rack-driven type-wheels, each having types "0" to "9" all normally out of printing position, and mechanism intermediate said pin-carrying bars and the racks of the type-wheels, whereby the type-wheels may be simultaneously rotated by the same bars each through an extra step over the register-wheel of the same denomination.

27. The combination of mechanism including a set of ten digit and zero keys and types controlled thereby for entering the amount upon one portion of a check, ten-step indexing mechanism connected with said keys, including unit-pin-carrying bars and associated register-wheels, each bar carrying ten pins, mechanism for imprinting the amount upon another portion of the check, said imprinting mechanism including a series of rack-driven type-wheels, each having digit and zero types, transverse shafts connecting the pin-carrying bars to the racks of the type-wheels for driving them through ten steps or less, and means to rotate the register-wheels through only nine steps or less and the type-wheels each an extra step over its associated adding register-wheel.

28. The combination of mechanism including a system of nine digit-keys, a zero-key and types operable by said keys for typewriting the amount upon one portion of a check, indexing mechanism controllable by only the line digit-keys, means connected with said indexing mechanism for adding the amount typed, including a series of racks and a set of rack-driven register-wheels, mechanism associated with said keys through said indexing mechanism for imprinting the typed and added amount upon another portion of the check, inclusive of the zeros, said imprinting mechanism including a series of racks and rack-driven type-wheels, and unit-pin carriers mounted on the register-wheel racks, each operative to impart a movement of one step to its type-wheel rack, before any movement is given to the corresponding register-wheel rack.

29. The combination of a ten-key digit and zero typewriting mechanism for entering the amount upon one portion of a check, ten-step digit and zero indexing mechanism, means associated therewith for adding the amount typed, including a series of rack-driven nine-step register-wheels, mechanism for imprinting the indexed digits and zeros upon another portion of the check, said imprinting mechanism including a series of rack-driven type-wheels, each having nine digit-types and a zero-type, a unit-pin carrier mounted on each register-wheel rack, and means for automatically giving a free longitudinal movement of one unit-distance to each register-wheel rack between fixed stops, to impart a movement of one step to each of the selected type-wheel racks before movement is imparted to the corresponding register-wheel rack.

30. The combination with a typewriting mechanism including a single set of ten digit and zero typing keys by which amounts are entered upon a check, of ten-step indexing devices for digits and zeros set up by the numeral-keys in typing the amount upon the check, subsequently-operable check-protecting mechanism controlled by the set-up ten-step indexing devices, and nine-step mechanism also governed by the set-up indexing devices for adding the digits typed and impressed by the check-protecting mechanism.

31. A check typing, protecting and computing apparatus including, in combination, a key-operated typing mechanism including a single set of ten digit and zero keys for typing the amount of the check, ten-step digit and zero indexing mechanism operable by said numeral-keys, check-reprinting mechanism including ten-step check-protecting printers controlled by said indexing mechanism, and computing mechanism automatically controlled through said indexing mechanism and connected to move always one less step than the reprinting mechanism.

32. The combination of mechanism for typewriting the amount upon a check, mechanism operatively connected thereto for adding the amount typed, mechanism also operatively connected thereto for imprinting the amount separately upon the check, said imprinting mechanism including unit-types in longitudinal alignment coextensive with the length of the check and arranged to be displaced with denominational numeral types selectively brought into alignment during the registering of the amount upon the check, and means to effect the protecting of the check by the types.

33. The combination of mechanism for typewriting the amount upon a check, including numeral keys operative to type at each depression of a key, mechanism actuated by any numeral-key in typing a numeral for adding the numerals typed, and mechanism conditioned by the adding mechanism for imprinting the same amount separately upon the check.

34. The combination with single set of numeral-keys, of mechanism controlled thereby for typewriting the amount upon a check, 10-step indexing mechanism operatively connected thereto, means controlled by said indexing mechanism to the extent of only 9 steps for subsequently adding the amount typed, check-protecting mechanism having means operatively connected to said indexing mechanism for reprinting the typed amount on the check, said reprinting mechanism including type-wheels set up by said indexing mechanism for reprinting the amount upon the check after the operation of adding the amount typed, and manual means for rotating the set-up check-protecting amount-line through a check-printing zone while the indexing mechanism is stationary.

35. A check drawing, adding and protecting machine including a single set of ten keys having means to typewrite the amount on the check, mechanism for concomitantly indexing the digits and zeros typed on the check by means of said keys a system of check-protecting elements having zero and digit types, to act upon the check to indicate the amount for which it is drawn, said indexing mechanism including evenly-spaced indexing bars, and said protecting elements being divided into unevenly-spaced groups, the group for cents having two elements, the group for dollars having two elements, the group for hundreds of dollars having one element, and the group for thousands of dollars having two elements, individual operative connections from the evenly-spaced indexing bars to the individual elements in the unevenly-spaced groups of printing elements, means for causing said check-protecting elements to act upon the check in combination in accordance with the indexing, means connected with the indexing mechanism for automatically adding the typed and indexed numbers, and manual means for rotating the set-up check-protecting amount-line through a check-protecting zone while said indexing mechanism is stationary.

36. The combination of a single set of ten digit and zero keys, mechanism controlled by said keys for typewriting the amount upon one portion of a check, ten-step indexing mechanism operatively connected to said keys, check-protecting mechanism operatively connected to said ten-step indexing mechanism to be governed thereby for imprinting the amount upon another portion of the check, including digits and zeros, said imprinting mechanism including a series of selective check-protecting combinative digit and zero types, means controlled through said indexing mechanism for combining the selected protecting types into register with one another selectively for printing, means also controlled to the extent of only nine steps by said indexing mechanism for adding the amount indexed by said digit-keys, and manual means for rotating the set-up check-protecting amount-line through a check-printing zone while the indexing mechanism is stationary.

37. The combination of a single set of ten digit and zero keys, mechanism controlled by said keys for typewriting the amount upon one portion of a check, ten-step digit and zero indexing mechanism operatively connected with said keys, digit and zero check-protecting mechanism governed by said indexing mechanism for reprinting the amount upon the check, said check-protecting mechanism including a series of check-protecting ten-step type-wheels employing numerals, said indexing mechanism including evenly-spaced indexing bars, and said type-wheels being divided into unevenly-spaced groups, the group for cents having two wheels, the group for dollars having two wheels, the group for hundreds of dollars having one wheel, and the group for thousands of dollars having two wheels, individual operative connections from the evenly-spaced indexing bars to the individual wheels in the unevenly-spaced groups of printing wheels, means for operating the wheels simultaneously in accordance with the presetting of the digit and zero indexing mechanism, nine-step means also controlled by said indexing mechanism for adding the amount typed and reprinted upon the check, and manual means for rotating the set-up check-protecting amount-line through a check-printing zone while the indexing mechanism is stationary.

38. The combination of mechanism having a single set of ten digit and zero keys for typewriting the amount upon a check, digit and zero indexing mechanism operatively connected thereto and associated with means for subsequently adding the amount typed, check-protecting digit and zero reprinting mechanism controlled by the indexing mechanism for reprinting the typed amount on the check, said reprinting mechanism including a set of numeral-printing check-protecting wheels indexed under the control of the same indexing mechanism, said indexing mechanism including evenly-spaced indexing bars, and said printing wheels being divided into unevenly-spaced groups, the group for cents having two wheels, the group for dollars having two wheels, the group for hundreds of dollars having one wheel, and the group for thousands of dollars having two wheels, individual operative connections from the evenly-spaced indexing bars to the individual wheels in the unevenly-spaced groups of printing wheels, and manual means for rotating the set-up check-protecting amount-line in the wheels through a check-protecting zone, while the indexing mechanism is stationary.

39. The combination of ten-key typewriting mechanism for entering the amount upon one portion of a check, ten-step digit and zero indexing mechanism operatively connected to the keys, check-protecting mechanism operatively connected to said indexing mechanism for printing the typed amount upon another portion of the check, including a series of type-wheels coextensive with the length of the amount-line on the check, means for selectively positioning the numeral type-faces at the printing line by said indexing mechanism, said indexing mechanism including evenly-spaced indexing bars, and said type-wheels being divided into unevenly-spaced groups, the group for cents having two wheels, the group for dollars having two wheels, the group for hundreds of dollars having one wheel, and the group for thousands of dollars having two wheels, individual operative connections from the evenly-spaced indexing bars to the individual wheels in the unevenly-spaced groups of printing wheels, manual means for rotating the set-up check-protecting amount-line through a check-printing zone while said indexing mechanism is stationary, and nine-step mechanism controlled by said indexing mechanism for adding the digits typed and printed on the check.

40. A check typing, protecting and computing apparatus including, in combination, a key-operated typing mechanism including a single set of ten digit and zero keys for typing the amount of the check, ten-step digit and zero indexing mechanism operable by said numeral-keys, check-reprinting mechanism including ten-step check-protecting printers controlled by said indexing mechanism, computing mechanism automatically controlled through said indexing mechanism and connected to move always one less step than the reprinting mechanism, said printers being controlled by said indexing mechanism, said indexing mechanism including evenly-spaced indexing bars, and said printers being divided into unevenly-spaced groups, the group for cents having two printers, the group for dollars having two printers, the group for hundreds of dollars having one printer, and the group for thousands of dollars having two printers, individual operative connections from the evenly-spaced indexing bars to the individual printers in the unevenly-spaced printer groups, said computing mechanism being connected to move one less step than the digit and zero printers, and manual means for rotating the set-up check-protecting amount-line through a check-printing zone while the indexing mechanism is stationary.

41. Mechanism for accurately drawing, manifolding, adding and protecting a check, with only a single manipulation of a single set of numeral-keys, including a carriage, keys from 1 to 0, type-manifolding elements controlled by said keys and separately typing the amount upon the check preparatory to protecting the check, indexing mechanism including bars and also including both digit and zero indexing pins upon each bar, means to enable said keys and carriage to control the indexing of said digit and zero pins concomitantly with typing the amount upon the check, 10-step check-protecting typewheels mounted side by side in denominational order and having digit-types cooperative to impress the indexed amount, said indexing bars being evenly spaced, and said type-wheels being divided into unevenly-spaced groups, the group for cents having two wheels, the group for dollars having two wheels, the group for hundreds of dollars having one wheel, and the group for thousands of dollars having two wheels, individual operative connections from the evenly-spaced indexing bars to the individual wheels in the unevenly-spaced groups of printing wheels, a general operator for actuating the index-pin bars to drive said wheels under control of said indexing means, means for protecting the check by impressing the numerals upon the typed check, while the indexing means is stationary, and computing mechanism controlled to the extent of 9 steps by the digit-indexing pins and operated by said general operator to compute the amount first typed and then impressed upon the check.

42. The combination of a key-operated typewriting mechanism including a single set of ten digit and zero keys by which amounts are entered upon one portion of a check, ten-step indexing devices for digits and zeros controllable by said keys in typing the amount on the check, check-protecting reprint mechanism to act upon another portion of the check and controlled by the set-up indexing devices, said indexing devices including evenly-spaced indexing bars, and also including digit and zero printing elements divided into unevenly-spaced groups, the group for cents having two elements, the group for dollars having two elements, the group for hundreds of dollars having one element, and the group for thousands of dollars having two elements, individual operative connections from the evenly-spaced indexing bars to the individual elements in the unevenly-spaced groups of digit-printing elements, nine-step mechanism also controlled by said indexing devices for adding the digits typed and reprinted, and manual means for rotating the set-up check-protecting amount-line through a check-protecting zone while said indexing mechanism is stationary.

HERBERT H. STEELE.